(12) United States Patent
Lisagor et al.

(10) Patent No.: US 12,423,290 B2
(45) Date of Patent: Sep. 23, 2025

(54) GENERATING ACCOUNT CONFIGURATIONS USING CONFIGURATION BUNDLES

(71) Applicant: Chime Financial, Inc., San Francisco, CA (US)

(72) Inventors: Roman Lisagor, Vancouver (CA); Praveen Jain, San Mateo, CA (US)

(73) Assignee: Chime Financial, Inc., San Francisco, CA (US)

( * ) Notice: Subject to any disclaimer, the term of this patent is extended or adjusted under 35 U.S.C. 154(b) by 173 days.

(21) Appl. No.: 17/816,583

(22) Filed: Aug. 1, 2022

(65) Prior Publication Data

US 2024/0037086 A1 Feb. 1, 2024

(51) Int. Cl.
*G06F 16/23* (2019.01)
*G06F 16/21* (2019.01)

(52) U.S. Cl.
CPC .......... *G06F 16/235* (2019.01); *G06F 16/213* (2019.01)

(58) Field of Classification Search
CPC .............................. G06F 16/213; G06F 16/235
See application file for complete search history.

(56) References Cited

U.S. PATENT DOCUMENTS

| | | | |
|---|---|---|---|
| 6,067,568 A * | 5/2000 | Li | H04L 41/00 709/223 |
| 2005/0228816 A1* | 10/2005 | McCauley | G06F 16/219 707/999.102 |
| 2012/0124551 A1* | 5/2012 | Holzbauer | G06F 8/24 717/104 |
| 2014/0100676 A1* | 4/2014 | Scott | G06F 3/0484 700/83 |
| 2014/0279332 A1* | 9/2014 | Poole | G06Q 20/3224 705/35 |
| 2021/0224839 A1* | 7/2021 | Bloy | G06Q 30/0236 |

\* cited by examiner

*Primary Examiner* — Marc S Somers
(74) *Attorney, Agent, or Firm* — Keller Preece PLLC

(57) ABSTRACT

This disclosure describes an account configurator system that, as part of an inter-network facilitation system, can generate account configurations for digital accounts using configuration bundles. For example, the disclosed systems can utilize custom tooling for an account configuration component that generates account configurations for digital accounts by augmenting baseline (e.g., default) product configurations with account overrides. To generate an account configuration, the disclosed systems can identify a baseline product configuration that references a configuration bundle for a subset of account configuration attributes and can modify the product configuration using an account override that also references a configuration bundle to supersede or replace one or more configuration attributes of the product configuration (with those of the configuration bundle referenced by the account override).

20 Claims, 11 Drawing Sheets

GENERATING ACCOUNT CONFIGURATIONS USING CONFIGURATION BUNDLES

BACKGROUND

Recent years have seen significant developments in systems that utilize distributed computing resources to process large data volumes in generating and managing digital accounts across computer networks. For example, conventional systems utilize a variety of computing devices to manage and track digital accounts to reflect parameters of the accounts, including changes or updates. To illustrate, conventional systems utilize various computer algorithms to manage digital accounts by storing account parameters, detecting changes to account parameters, and updating account parameters for each account. Although conventional systems utilize various computer-implemented algorithms to generate and manage digital accounts, conventional systems nevertheless suffer from a number of technical deficiencies, particularly with regard to efficiency and flexibility.

As just suggested, some existing networking systems are inefficient. In particular, some prior networking systems waste computer storage resources by storing account configuration attributes individually across accounts. Indeed, many existing systems store each separate configuration attribute for each digital account as its own data entry within a computer database. As networks grow larger and as more accounts are stored within these prior systems, the storage requirements for maintaining the data for configuration attributes across a growing number of accounts likewise increase in size. By storing such large amounts of information, these conventional systems require substantial computer database capacity that might otherwise be reduced with a more efficient system.

As another example of their inefficiency, some prior network systems require significant processing power to update account attributes. To elaborate, upon detecting a change to an attribute that is relevant (or that applies) to multiple digital accounts, existing systems often apply the change by updating the corresponding data field at each individual account. Over large numbers of digital accounts, this process of updating every affected attribute at each account becomes computationally expensive, especially in cases where attributes updates occur frequently and/or for large numbers of attributes. Thus, many conventional systems waste computer processing power that could be preserved with a more efficient system.

These inefficiencies not only lead to increased computer resource utilization but undermine the flexibility and functionality of implementing computing devices. Updating digital accounts by modifying attribute-level data fields at each impacted account limits the adaptability of existing systems. For example, when updating accounts, existing systems rigidly and painstakingly apply the update to each affected data field, incapable of adapting to updates more flexibly. Additionally, rigid adherence to attribute-level updates introduces latency (resulting from it computationally intensive nature) that ties up the resources of computing devices and prevents them from performing other functions.

These, along with additional problems and issues, exist with conventional networking systems.

SUMMARY

This disclosure describes one or more embodiments of methods, non-transitory computer-readable media, and systems that can solve the foregoing problems in addition to providing other benefits. Particularly, the disclosed systems can improve efficiency and flexibility by utilizing an account configuration component of an inter-network facilitation system to generate account configurations from configuration bundles. For example, the disclosed systems can utilize custom tooling for an account configuration component that generates account configurations for digital accounts by augmenting baseline (e.g., default) product configurations with account overrides. In some cases, the disclosed systems generate the account configurations by combining product configurations and account overrides, where both are defined to reference configuration bundles that lay out (groups of) configuration attributes as key-value pairs. Thus, to generate an account configuration, the disclosed systems can identify a baseline product configuration that references a configuration bundle for (some of) the account configuration attributes and can modify the product configuration using an account override that also references a configuration bundle to supersede or replace one or more configuration attributes of the product configuration (with those of the configuration bundle referenced by the account override).

BRIEF DESCRIPTION OF THE DRAWINGS

The detailed description refers to the drawings briefly described below.

DETAILED DESCRIPTION

Figure 1:
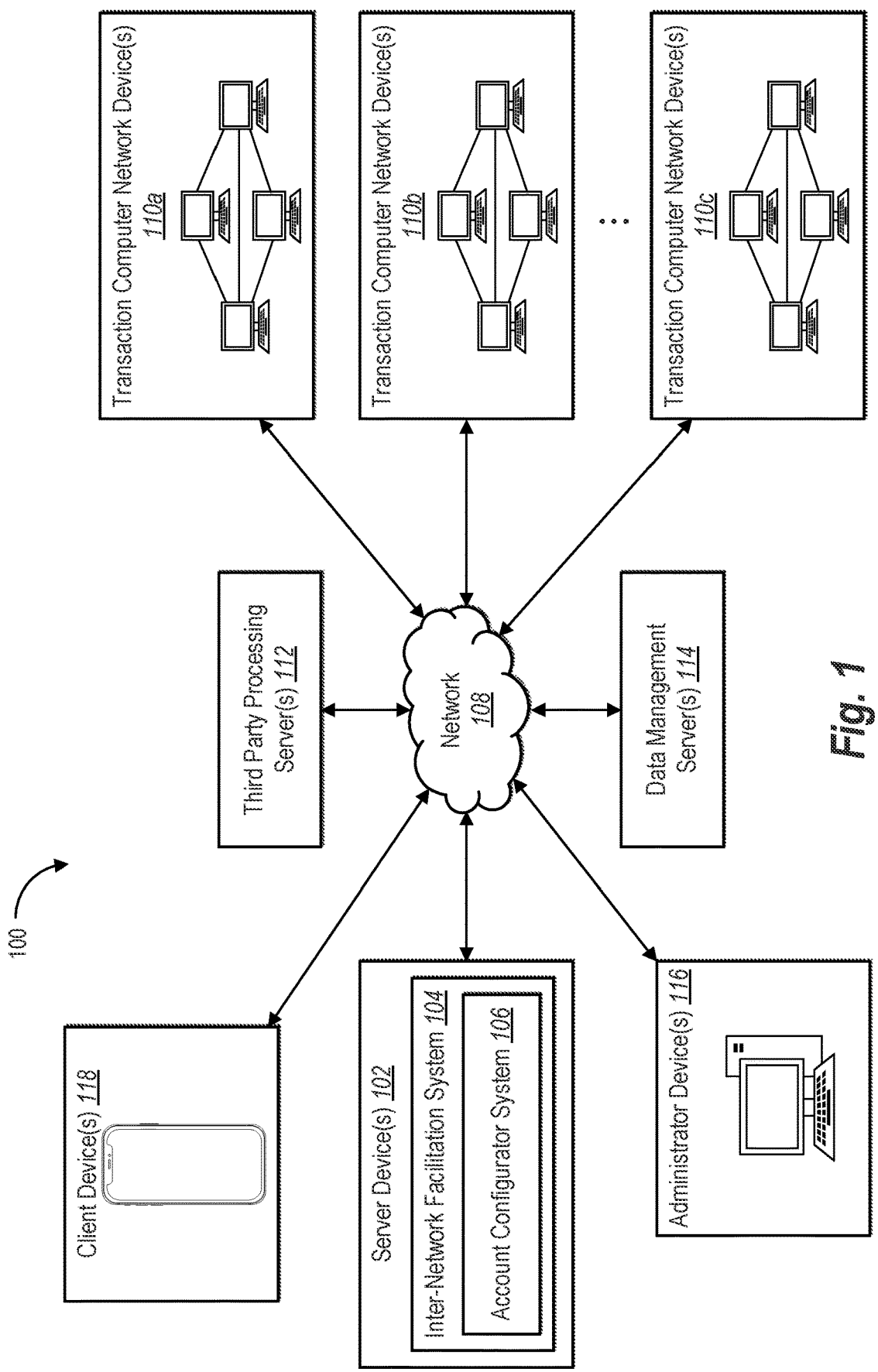
FIG. 1 illustrates a block diagram of an environment for implementing an inter-network facilitation system and an account configurator system in accordance with one or more embodiments.

This disclosure describes an account configurator system that can efficiently and flexibly generate and update account configurations utilizing configuration bundles referenced by product configurations and account override configurations. In some situations, network-based systems pass information among multiple servers hosting multiple compartmentalized components, modules, or services (with shared or independent processor(s)) to perform respective functions, where different network components generate and receive different data to perform their respective functions as part of the overarching ecosystem. For instance, in response to a request from a network component (or a third-party system) to access an account configuration for a particular (type of) digital account within an inter-network facilitation system, the account configurator system can use multiple data constructs to generate and pass the requested data to the third-party system safely and securely: 1) a product configuration defining a default set of configuration attributes for the user profile, 2) an account override configuration indicating one or more replacement configuration attributes for replacing default attributes in the product configuration, and 3) one or more configuration bundle instances including (groups of) configuration attributes referenced by the product configuration and/or the account override configuration.

As just mentioned, the account configurator system can generate and store product configurations, account override configurations, and configuration bundle instances. To elaborate, the account configurator system can generate a product configuration by setting or defining key names (e.g., naming particular attributes) and corresponding values for the key names within the product configuration. In addition, the account configurator system can generate an account override configuration in a similar fashion, by defining a new value for (e.g., a replacement value to supersede a value of a production configuration corresponding to) a key name within a product configuration. In some cases, the account configurator system can generate a configuration bundle instance (referenced by a product configuration and/or an account override configuration) by defining key names and corresponding values referenced by (and thus included within) product configurations and/or account override configurations.

As part of generating a configuration bundle instance, the account configurator system can generate or define a bundle type. Specifically, the account configurator system can generate a bundle type that defines or reflects an arrangement or structure for one or more configuration bundle instances. In some cases, the account configurator system generates a bundle type to include key names and corresponding schema value types indicating data types or formats designated for (or compatible with) the key names. Thus, when generating a configuration bundle instance from a bundle type, the account configurator system can fill in or populate specific values for the key names according to the schema value types (e.g., Boolean, number, character, or string).

Along these lines, the account configurator system can generate or define a product schema for one or more product configurations and/or an account override schema for account override configurations. In particular, the account configurator system can generate a product schema defining an arrangement or structure of a product configuration by setting key names and corresponding schema value types designating data types or formats for the key names in the product schema. Additionally, the account configurator system can generate an account override schema defining an arrangement or structure of an account override configuration by setting key names and corresponding schema value types designating data types or formats for the key names in the account override schema.

As also mentioned, the account configurator system can provide an account configuration for a digital account in response to a configuration query. More particularly, the account configurator system can receive a configuration query for an account from a network component within an inter-network facilitation system and/or from a third-party system. For example, the account configurator system can receive a request from a banking system to report on one or more attributes of a particular (type of) digital account managed by the inter-network facilitation system.

Based on the configuration query, the account configurator system can generate and provide an account configuration. Specifically, the account configurator system can generate an account configuration for the requested account from a product configuration, one or more account override configurations, and/or one or more configuration bundle instances. For example, the account configurator system generates an account configuration by identifying a product configuration corresponding to the requested/queried account. Within the product configuration, the account configurator system identifies or determines key names and corresponding values, some of which may be bundle values referencing configuration bundle instances.

Additionally, the account configurator system can override or replace one or more values of the product configuration by determining an account override configuration for the requested/queried account. For instance, the account configurator system can determine a replacement value for a key name from an account override configuration (e.g., to replace a baseline value for the key name set by the product configuration). In some cases, the replacement value references or indicates a configuration bundle instance, whereupon the account configurator system accesses the key-value pairs of the configuration bundle instance to include within the account configuration. Thus, the account configurator system generates the account configuration to indicate, include, or reflect key-value pairs from the product configuration with one or more values replaced using the account override configuration, where key names that corresponds to a bundle value pull in (or cause to be included) the key-value pairs of the configuration bundle instance corresponding to the bundle value.

As suggested above, the disclosed account configurator system provides several improvements or advantages over conventional networking systems. For example, the account configurator system can improve efficiency over prior systems. As opposed to prior systems that require excessive volumes of computer storage for storing individual configuration attributes for every account as independent data fields, the account configurator system can reduce the storage requirements of configuration attributes by introducing configuration bundles. By implementing a configuration bundle instance that stores configuration attributes referenced by (or applicable across) multiple product/account configurations, the account configurator system can condense the storage of these configuration attributes into a centralized location. Indeed, rather than individually storing each attribute for every account, the account configurator system can group configuration attributes into configuration bundles for consolidated, condensed storage (where the attributes of the configuration bundles are referenced by and applicable to product/account configurations). As a result of implementing configuration bundles for condensed storage, the account configurator system preserves computer memory and storage resources wasted by prior systems that use less efficient techniques.

As another example of the improved efficiency of the account configurator system, the account configurator system can reduce the computer processing requirements of prior systems. For example, not only do many prior systems require excessively large databases, but prior systems also propagate updates or changes to account attributes or configuration parameters by individually applying the change to each attribute field at each affected account. The account configurator system, by contrast, utilizes configuration bundles to apply attribute updates or modifications more efficiently. For example, based on a change to a configuration attribute, the account configurator system can update the corresponding key name and/or value within a (single) configuration bundle instance, whereupon the change is automatically (e.g., without further user interaction or computer processing) applied or propagated to (multiple) product/account configurations that reference the configuration bundle instance. Consequently, the account configurator system requires less processing power compared to existing systems. Such processing improvements are especially pronounced in larger systems, where the numbers of accounts and network components is greater (and therefore requires more processing).

In addition to improving efficiency, the account configurator system can also improve flexibility over existing networking systems. While some existing network systems are rigidly fixed to updating attributes individually across each account, the account configurator system can utilize configuration bundles that are adaptable across multiple accounts and/or products. For example, the account configurator system can adapt an updated value of a single configuration bundle instance across a plurality of product/account configurations that reference the configuration bundle instance. By improving the flexibility in this way, the account configurator system further reduces latency (e.g., increases update speed) to free up resources of implementing computing devices for performing other functions.

As indicated by the foregoing discussion, the present disclosure utilizes a variety of terms to describe features and advantages of the account configurator system. For example, as used herein, the term "inter-network facilitation system" refers to a system that, via the account configurator system, facilitates digital communications across different computing systems over one or more networks. For example, an inter-network facilitation system manages digital accounts, such as credit accounts, bank accounts, transaction card accounts, and secured accounts in addition to financial information, such as funds transfers, withdrawals, deposits, and loans for one or more user profiles registered within the inter-network facilitation system. In some cases, the inter-network facilitation system is a centralized network system that includes multiple network components for facilitating access to online digital accounts via a central network location. Indeed, the inter-network facilitation system can link accounts from different network-based financial institutions to provide information regarding, and management tools for, the different accounts.

Relatedly, as used herein, the term "digital account" (or sometimes simply "account") refers to a network-based repository of digital information for a particular client device or user. For example, a digital account can include a repository of digital information corresponding to a client having a particular configuration of attributes or parameters for performing network transactions. In particular, an account can include configuration attributes that lay out or define a specific instance of a network-based product. Indeed, an account can include (or be defined by) a product configuration for a product and one or more account override configurations that alter, replace, or supersede corresponding portions of the product configuration specifically for a certain instance of the product (e.g., associated with a particular account number).

As used herein, the term "account override configuration" can include definitions for one or more configuration attributes (e.g., key-value pairs) specific to a particular account and that override, replace, or supersede corresponding (baseline) configuration attributes of a product configuration. In particular, an account override configuration can define values for key names specific to an account according to an account override schema. As used herein, the term "account override schema" refers to a layout, structure, or arrangement of configuration attributes (e.g., key-value pairs) for a specific account. Particularly, while an account override configuration defines the specific values for key names of attributes, the account override schema defines the structure for those key-value pairs, including the key names and corresponding data types or formats for values matching the key names (without necessarily defining that actual values themselves).

Along these lines, the term "product" refers to a network-based repository of baseline digital information (e.g., baseline information applicable to one or more accounts). For example, a product includes a repository having a default or baseline configuration of attributes or parameters for performing network transactions associated with one or more accounts. In particular, a product can include a set of configuration attributes that define default or baseline parameters for one or more accounts that belong to, or that reference, the product. For instance, a product can include a type or format for one or more financial offerings provided by financial institutions, such as a bank account, a debit card account, a cash card account, a credit card account, or a gift card account.

As mentioned, a product can include a "product configuration" that lays out the definitions for configuration attributes (e.g., key-value pairs) for a particular product. In particular, a product configuration can define the values for key names of attributes for a product according to a product schema. For example, a product configuration can include an attribute key that names or labels a certain attribute, along with a bundle value that corresponds to the attribute key and that indicates or references a configuration bundle instance. As used herein, the term "product schema" refers to a layout, structure, or arrangement of configuration attributes (e.g., key-value pairs) for a product. Particularly, while a product configuration defines the specific values for key names of attributes of a product, the product schema defines the structure for those key-value pairs, laying out the key names and corresponding data types or formats for values matching the key names (without defining the actual values themselves).

As used herein, the term "configuration attribute" (or sometimes simply "attribute") refers to a key-value pair that includes a key name and a corresponding value for an attribute or parameter of an account or product. In particular, a configuration attribute refers to a certain key-value pair that defines a parameter limiting or defining the operation of a product or account. Example configuration attributes define values for card spend limits, withdrawal limits, account names, card bins, gas station authorization limits, vendor identifications, and credit limits.

As mentioned, the account configurator system can receive a configuration query from a network component. As used herein, the term "configuration query" refers to a query or a request for an account configuration. For example, a configuration query refers to a network-based data request for key-value pairs (of an account configuration) specific to an account named in the query. As used herein, the term "account configuration" refers to a set of configuration attributes (e.g., key-value pairs) for a particular account, including key names and specific values for the key names. For instance, an account configuration can include key-value pairs from a product configuration and key-value pairs from one or more account override configurations that replace corresponding key-value pairs from the product configuration.

Additionally, the term "network component" (or sometimes simply "component") refers to a computer application or subsystem operated by one or more processors (hosted by one or more servers) that are dedicated to a particular computer task or process. For example, a network component can be part of a larger network-based system and can be communicatively coupled (e.g., via a computer network) to other network components for passing data therebetween to form a networking environment of cooperating network components. A network component can perform one or more tasks associated with one or more applications (e.g., client device applications) that access an inter-network facilitation system. Thus, an inter-network facilitation system can include multiple (containerized) network components that each perform respective functions as subsystems within the system. In certain embodiments, a network component refers to a server running a specific process, where a publisher network component refers to a first server and a subscriber network component refers to a second server. In some cases, one network component receives and/or provides digital communications to a client device while another network component generates a digital payload for a request received from the client device (e.g., a request to generate a user profile or a request to transfer funds to another user profile) and yet another network component receives the digital payload to perform the requested function.

As mentioned, in some embodiments, the account configurator system can generate and utilize configuration bundles for determining account configurations. As used herein, the term "configuration bundle instance" refers to (an instance of) a repository or grouping of configuration attributes (e.g., key-value pairs) accessible by product configurations and/or account override configurations. In particular, a product configuration and/or an account override configuration can access or reference a configuration bundle instance (e.g., as a value within a key-value pair), whereupon the product configuration/account override configuration receives or subsumes the configuration attributes (e.g., key-value pairs) of the configuration bundle. For example, a single configuration bundle instance can define configuration attributes for multiple product configurations and/or account configurations within a single structure or a single database location.

In some cases, a configuration bundle instance defines configuration attributes by setting specific values for key names of a bundle type. As used herein, the term "bundle type" refers to an arrangement, structure, or schema of a configuration bundle. In particular, a bundle type can include attribute keys and corresponding schema value types for the attribute keys (without defining the specific values themselves). For instance, a bundle type can lay out schema value types such as Boolean, string, character, or number for various attribute keys.

Additional detail regarding the account configurator system will now be provided with reference to the figures. In particular, FIG. 1 illustrates a block diagram of a system environment (or "environment") 100 for implementing an inter-network facilitation system 104 and an account configurator system 106 in accordance with one or more embodiments. As shown in FIG. 1, the environment 100 includes server device(s) 102, various transaction computer network devices 110a-110c, third party processing server(s) 112, data management server(s) 114, administrator device(s) 116, and client device(s) 118 connected via a network 108. While FIG. 1 shows an embodiment of the account configurator system 106, alternative embodiments and configurations are possible. Furthermore, although FIG. 1 illustrates the account configurator system 106 being implemented by a particular component and/or device within the environment 100, the account configurator system 106 can be implemented, in whole or in part, by other computing devices and/or components in the environment 100 (e.g., the administrator device(s) 116 and/or the client device(s) 118). Additional description regarding the illustrated computing devices is provided with respect to FIGS. 9-10 below.

As shown in FIG. 1, the server device(s) 102 can include the inter-network facilitation system 104. In some embodiments, the inter-network facilitation system 104 determines, stores, generates, and/or displays financial information corresponding to a digital account (e.g., a banking application, a money transfer application). Furthermore, the inter-network facilitation system 104 can electronically communicate (or facilitate) financial transactions between one or more digital accounts (and/or computing devices). In some embodiments, the inter-network facilitation system 104 also tracks and/or monitors financial transactions and/or financial transaction behaviors of a user within a user profile.

Indeed, in some examples, the inter-network facilitation system 104 facilitates financial transactions and digital communications across different computing systems and/or network components over one or more transaction computer networks. Indeed, as shown, the environment 100 also includes transaction computer network devices 110a-110c (or "transaction computer networks"). The transaction computer network devices 110a-110c can include a variety of computer devices for implementing, facilitating, processing, or executing a transaction. Thus, for instance, the transaction computer network devices 110a can include a card transaction computer network for implementing a variety of transactions using cards (e.g., credit cards, debit cards, etc.). Similarly, the transaction computer network devices 110b can include an ACH transaction computer network (e.g., computing devices for implementing ACH transactions), and the transaction computer network devices 110c can include a transfer transaction computer network (e.g., computing devices for implementing transfer transactions between accounts).

For example, the inter-network facilitation system 104 manages digital accounts, such as credit accounts, secured accounts, and other accounts for a single account registered within the inter-network facilitation system 104. In some cases, the inter-network facilitation system 104 is a centralized network system that facilitates access to online banking accounts, credit accounts, and other accounts within a central network location. Indeed, the inter-network facilitation system 104 can link accounts from different network-based financial institutions (e.g., the transaction computer network devices 110a-110c) to provide information regarding, and management tools for, the different accounts. Furthermore, the account configurator system 106 can provide various user interfaces and information for display (e.g., via the administrator device(s) 116 and/or the client device(s) 118).

As also illustrated in FIG. 1, the environment 100 includes the administrator device(s) 116 and the client device(s) 118. For example, the administrator device(s) 116 and the client device(s) 118 may include, but are not limited to, a mobile device (e.g., smartphone, tablet) or other type of computing device, including those explained below with reference to FIGS. 9-10. For example, the administrator device(s) 116 can include computing devices that display user interfaces for administrating or managing settings, configurations, pipelines, or data for the inter-network facilitation system 104. Moreover, the client device(s) 118 can include computing devices associated with (and/or operated by) users and corresponding user profiles for the inter-network facilitation system 104. In some embodiments, the client device(s) 118 include computing devices that display user interfaces for managing digital accounts (e.g., transferring assets, making payments, etc.) and/or portraying information regarding digital accounts (e.g., account transactions, account balances, etc.). Moreover, although FIG. 1 illustrates a single instance of the administrator device(s) 116 and the client device(s) 118, the environment 100 can include various numbers of administrator or client devices that communicate and/or interact with the inter-network facilitation system 104 and/or the account configurator system 106.

In one or more embodiments, the client device(s) 118 include a client application. The client application can include instructions that (upon execution) cause the client device(s) 118 to perform various actions. For example, a user associated with an account can interact with the client application on the client device(s) 118 to access financial information, initiate a financial transaction, or modify account settings. In some embodiments, the administrator device(s) 116 also includes an administrator application similar to the client application. The client application may be a web application or a native application (e.g., a mobile application, a desktop application, etc.). In one or more implementations, the client application interfaces with the inter-network facilitation system 104 to provide digital content including graphical user interfaces to the client device(s) 118. In one or more implementations, the client application comprises a browser that renders graphical user interfaces on the display of the client device(s) 118.

In certain instances, the client device(s) 118 corresponds to one or more user accounts (e.g., user accounts stored at the server device(s) 102). For instance, a user of a client device can establish a user profile with login credentials and various information corresponding to the user. In addition, the digital accounts and/or user profiles can include information regarding financial information and/or financial transaction information for users (e.g., name, telephone number, address, bank account number, credit amount, debt amount, financial asset amount), payment information, transaction history information, and/or contacts for financial transactions. In some embodiments, a digital account and/or a user profile can be accessed via multiple devices (e.g., multiple client devices) when authorized and authenticated.

The present disclosure utilizes client devices to refer to devices associated with such user profiles. In referring to a client device, the disclosure and the claims are not limited to communications with a specific device, but any device corresponding to a user profile of a particular user. Accordingly, in using the term computing device, this disclosure can refer to any computing device corresponding to a user profile of an inter-network facilitation system.

As shown, the environment 100 also includes third party processing server(s) 112. For example, in one or more embodiments, the inter-network facilitation system 104 utilizes the third party processing server(s) 112 to assist in processing transactions (e.g., managing a system of record, transferring funds between accounts, implementing transaction pipelines, etc.). The third party processing server(s) 112 can include a variety of server devices, as described below in relation to FIGS. 9-10.

Furthermore, as illustrated in FIG. 1, the environment 100 also includes data management server(s) 114. The data management server(s) 114 can include integrated or external (e.g., third party) servers for storing, analyzing, and managing data volumes. For example, the data management server(s) 114 can include a variety of cloud/web-based systems for storing, processing, analyzing, and delivering transaction data and/or account data. The data management server(s) 114 can include a variety of server devices, as described with regard to FIGS. 9-10.

As further shown in FIG. 1, the environment 100 includes the network 108. As mentioned above, the network 108 can enable communication between components of the environment 100. In one or more embodiments, the network 108 may include a suitable network and may communicate using a various number of communication platforms and technologies suitable for transmitting data and/or communication signals, examples of which are described with reference to FIGS. 9-10. Furthermore, although FIG. 1 illustrates the server device(s) 102, the transaction computer network devices 110a-110c, the third party processing server(s) 112, the data management server(s) 114, and the administrator device(s) 116 communicating via the network 108, the various components of the environment 100 can communicate and/or interact via other methods (e.g., the server device(s) 102 and the administrator device(s) 116 can communicate directly).

Figure 2A:
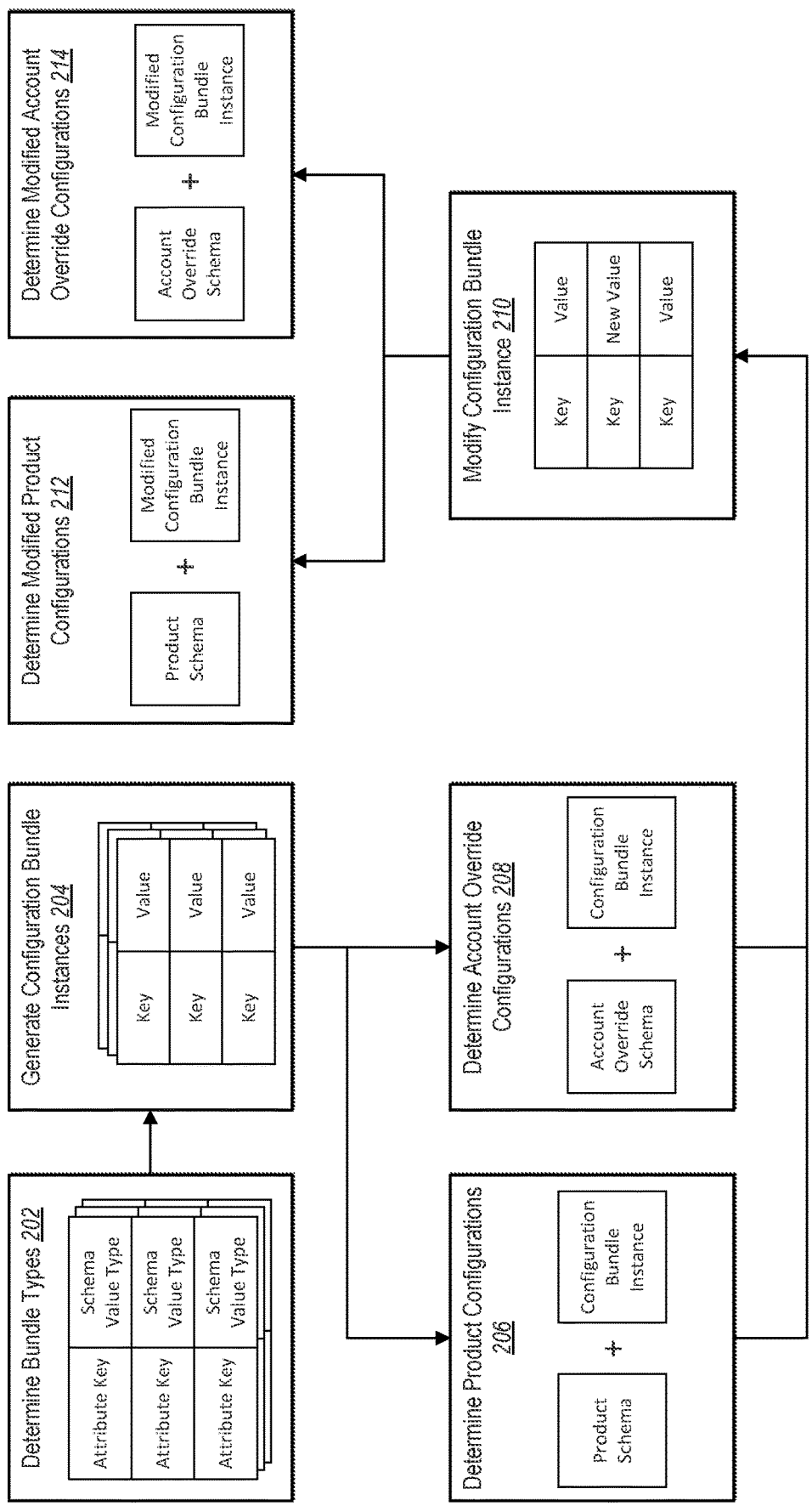
FIG. 2A illustrates an example overview of generating and updating configuration bundle instances in accordance with one or more embodiments.
Figure 2B:
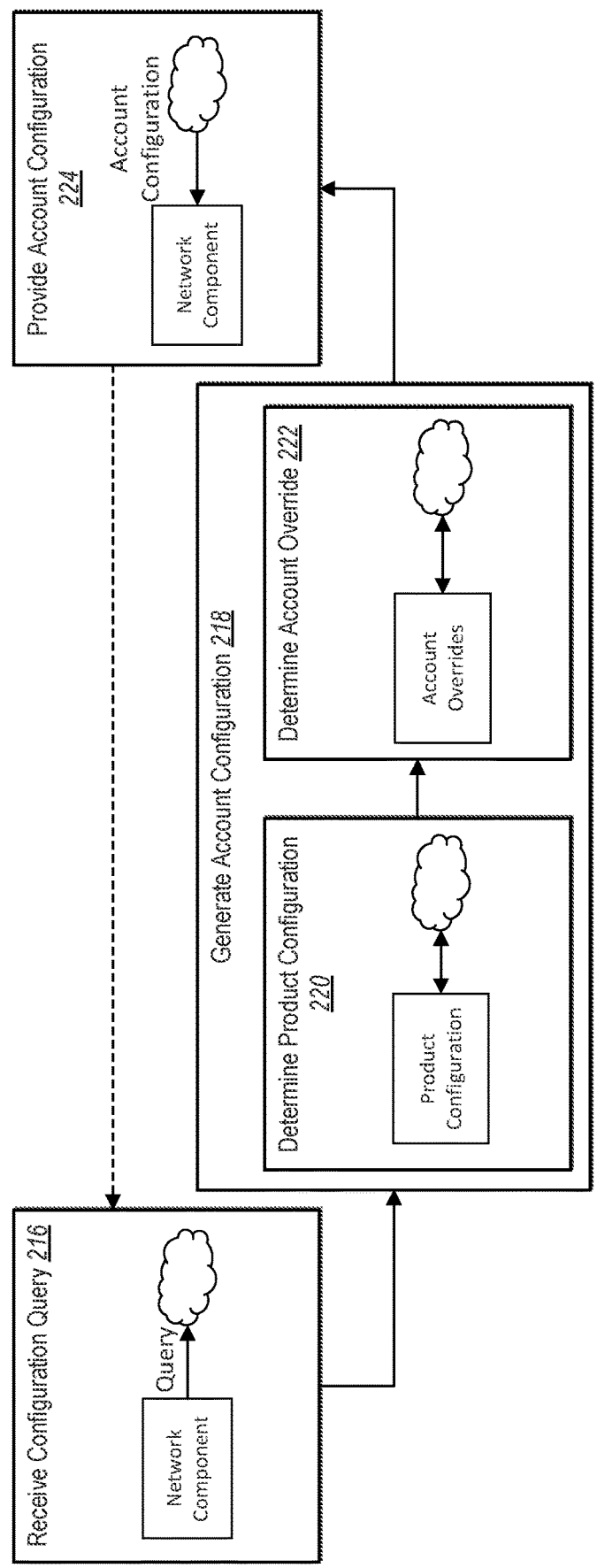
FIG. 2B illustrates an example overview of generating an account configuration using configuration bundle instances in accordance with one or more embodiments.

As mentioned, in certain embodiments, the account configurator system 106 can generate and store a configuration bundle for determining or generating account configurations. In particular, the account configurator system 106 can generate configuration bundle instances accessible by, and defining key-value pairs for, product configurations and account override configurations that combine to form account configurations. FIGS. 2A-2B illustrate overviews of generating and utilizing configuration bundle instances for determining account configurations in accordance with one or more embodiments. Specifically, FIG. 2A illustrates an overview of generating and updating configuration bundle instances. Additionally, FIG. 2B illustrates an overview of utilizing a configuration bundle instance to generate and provide an account configuration for a configuration query. Additional detail regarding the acts of FIGS. 2A-2B is provided thereafter with reference to subsequent figures.

As illustrated in FIG. 2A, the account configurator system 106 performs an act 202 to determine bundle types. In particular, the account configurator system 106 determines bundle types for configuration bundles stored within one or more databases or repositories (e.g., as managed by the data management server(s) 114). For example, the account configurator system 106 determines or generates bundle types to store within a database for setting configuration bundles. To generate a bundle type, the account configurator system 106 determines an arrangement or structure of key-value pairs, including a number of attribute keys that label or name particular attributes (e.g., account name, daily withdrawal limit, daily card limit, international transaction enablement, etc.) and corresponding schema value types that indicate data types or formats designated for (or compatible with) the respective attribute keys (e.g., Boolean, string, character, or number). In addition, the account configurator system 106 stores the bundle type within a repository or database for recall when generating configuration bundle instances.

As just mentioned, the account configurator system 106 can perform an act 204 to generate configuration bundle instances. To generate a configuration bundle instance, the account configurator system 106 accesses a bundle type that defines the format or schema for the configuration bundle instance. According to the bundle type, the account configurator system 106 further determines or identifies specific values for the key names indicated by the bundle type. In identifying or determining the values, the account configurator system 106 identifies or determines values having formats that match or align with the schema value types defined by the bundle type of the configuration bundle instance. The account configurator system 106 can generate multiple configuration bundle instances according to various bundle types, and the account configurator system 106 can store the configuration bundle instances within a repository or database.

As further illustrated in FIG. 2A, the account configurator system 106 performs an act 206 to determine product configurations. Indeed, the account configurator system 106 determines the product configurations based on configuration bundle instances stored within a database. In some cases, the account configurator system 106 determines a specific product configuration for a specific product (e.g., a specific bank account or credit card), where the product configuration references one or more configuration bundle instances (e.g., as a bundle value indicating or corresponding to an attribute key). In particular, based on adding a bundle value to a product configuration, the account configurator system 106 generates a product configuration to include the configuration attributes (e.g., the key-value pairs) of the referenced configuration bundle instance as part of the product configuration.

As shown, the account configurator system 106 determines a product configuration according to a product schema and a configuration bundle instance. Specifically, the account configurator system 106 formats or structures the product configuration according to a product schema that designates labels for key names as well as data types for values corresponding to the key names. As mentioned, one or more key names can have values that take the form of bundle values which reference configuration bundle instances to be included as part of the product configuration. Indeed, as shown, the account configurator system 106 combines the product schema and one or more configuration bundle instances to determine an overall product configuration. The account configurator system 106 can further store the product configurations within a repository or database.

Additionally, the account configurator system 106 performs an act 208 to determine account override configurations (e.g., after determining product configurations, in parallel with determining product configurations, or before determining product configurations). Indeed, similar to determining product configurations, the account configurator system 106 determines the account override configurations by determining or identifying key-value pairs that define configuration attributes of an account (e.g., a particular bank account or a particular credit account). In some cases, the account configurator system 106 defines a key-value pair where the value is a bundle value that references a configuration bundle instance. Accordingly, the account configurator system 106 generates the account override configuration to include or subsume the key-value pairs of the configuration bundle instance referenced by the bundle value of the account override configuration.

As shown, the account configurator system 106 determines an account override configuration according to an account override schema and a configuration bundle instance. Specifically, the account configurator system 106 formats or structures the account override configuration according to an account override schema that designates labels for key names and data types for corresponding values. As mentioned, one or more key names can have values that take the form of bundle values which reference configuration bundle instances to be included as part of the account override configuration. Indeed, as shown, the account configurator system 106 combines the account override schema and one or more configuration bundle instances to determine an overall account override configuration. The account configurator system 106 can further store the account override configurations As further illustrated in FIG. 2A, the account configurator system 106 performs an act 210 to modify a configuration bundle instance. More specifically, the account configurator system 106 modifies a configuration bundle instance based on receiving or detecting an update to one or more key names or corresponding values within the configuration bundle instance (e.g., as set by the third party processing server(s) 112 or the administrator device(s) 116). For example, the account configurator system 106 detects or receives an indication to change a value for a certain key from a first value to a new value within a configuration bundle instance.

Accordingly, the account configurator system 106 updates or modifies the configuration bundle instance to reflect the new value corresponding to the key. Based on updating the configuration bundle instance, the account configurator system 106 can automatically propagate the update to product configurations and/or account override configurations that reference the configuration bundle instance based on the single modification, without the need to apply the update at the many individual data fields across the products and accounts that would otherwise include the affected value.

Along these lines, and as further illustrated in FIG. 2A, the account configurator system 106 performs an act 212 to determine modified product configurations. In particular, the account configurator system 106 determines a modified product configuration based on modifying a configuration bundle instance. For example, the account configurator system 106 identifies a stored product configuration that references (as a bundle value within a key-value pair) a configuration bundle instance, and the account configurator system 106 updates the product configuration to reflect the new value of the updated configuration bundle instance referenced by the product configuration.

Similarly, the account configurator system 106 performs an act 214 to determine modified account override configurations. More specifically, the account configurator system 106 identifies one or more stored account override configurations that reference a configuration bundle instance that has been updated or modified. For example, the account configurator system 106 identifies, within a key-value pair within the account override configuration, a bundle value that references the modified configuration bundle instance. Accordingly, the account configurator system 106 updates the account override configuration to include the new value of the modified configuration bundle instance referenced by the bundle value.

As mentioned, in one or more embodiments, the account configurator system 106 generates an account configuration for a configuration query. In particular, the account configurator system 106 receives a configuration query from a network component (or a third party system) and provides an account configuration in response to the query. FIG. 2B illustrates an overview of generating an account configuration in response to a configuration query in accordance with one or more embodiments.

As shown, in FIG. 2B, the account configurator system 106 performs an act 216 to receive a configuration query. More specifically, the account configurator system 106 receives a configuration query from a network component within the inter-network facilitation system 104 or from a third party system. For example, the account configurator system 106 receives a configuration query that indicates a particular account (e.g., by referencing an account identifier and/or other information specifying the particular account). In some cases, the account configurator system 106 receives a configuration query that specifies a key name and/or value specifying an account identifier of an account to perform a particular task for, such as determining one or more limits for the account and/or to issue a new product (e.g., a new credit card) for the account.

As illustrated in FIG. 2B, the account configurator system 106 performs an act 218 to generate an account configuration for the configuration query. In particular, the account configurator system 106 generates the account configuration by performing an act 220 to determine a product configuration and an act 222 to determine an account override configuration. More specifically, to determine a product configuration, the account configurator system 106 analyzes a database or a repository of product configurations to identify and select a product configuration that corresponds to an account indicated by the configuration query. For example, the account configurator system 106 determines a product configuration that specifies a set of baseline key-value pairs for the account configuration. In one or more embodiments, the product configuration extracts attributes or key-value pairs that reference configuration bundle instances to define the product configuration to include the key-value pairs of the configuration bundle instances.

In some cases, the account configurator system 106 may not determine any account override configurations, and the baseline key-value pairs of the product configuration can reflect the attributes for the overall account configuration (to provide to the network component in response to the configuration query). In certain embodiments, however, the account configurator system 106 further performs an act 222 to determine an account override configuration. Indeed, the account configurator system 106 determines an account override configuration for the query by accessing a database of account override configurations to identify and select an account override configuration corresponding to an account referenced by the configuration query (e.g., with a matching account identification).

Based on identifying an applicable account override configuration, the account configurator system 106 applies the account override configuration (by extracting its attributes) to replace one or more baseline attributes (e.g., key-value pairs) of the product configuration. For example, the account configurator system 106 replaces a particular value with an override value. In some cases, the account configurator system 106 replaces a bundle value with a new bundle value to reference a new or different configuration bundle instance, thereby updating the product configuration to include the attributes of the new configuration bundle instance. Thus, the account configurator system 106 generates an account configuration by combining a product configuration (e.g., via the act 220) with an account override configuration (e.g., via the act 222) to use a set baseline product attributes and one or more override attributes that replace some baseline attributes.

As further illustrated in FIG. 2B, the account configurator system 106 performs an act 224 to provide the account configuration. More specifically, the account configurator system 106 provides the account configuration to the network component or the third party system that provides the configuration query. For instance, the account configurator system 106 provides the account configuration that defines key-value pairs for the requested/queried account so that the network component or third party system can perform a process or event associated with the inter-network facilitation system 104 (e.g., to determine a particular withdrawal limit for the account, to add a product to the account, or to perform a transaction between accounts).

Figure 3:
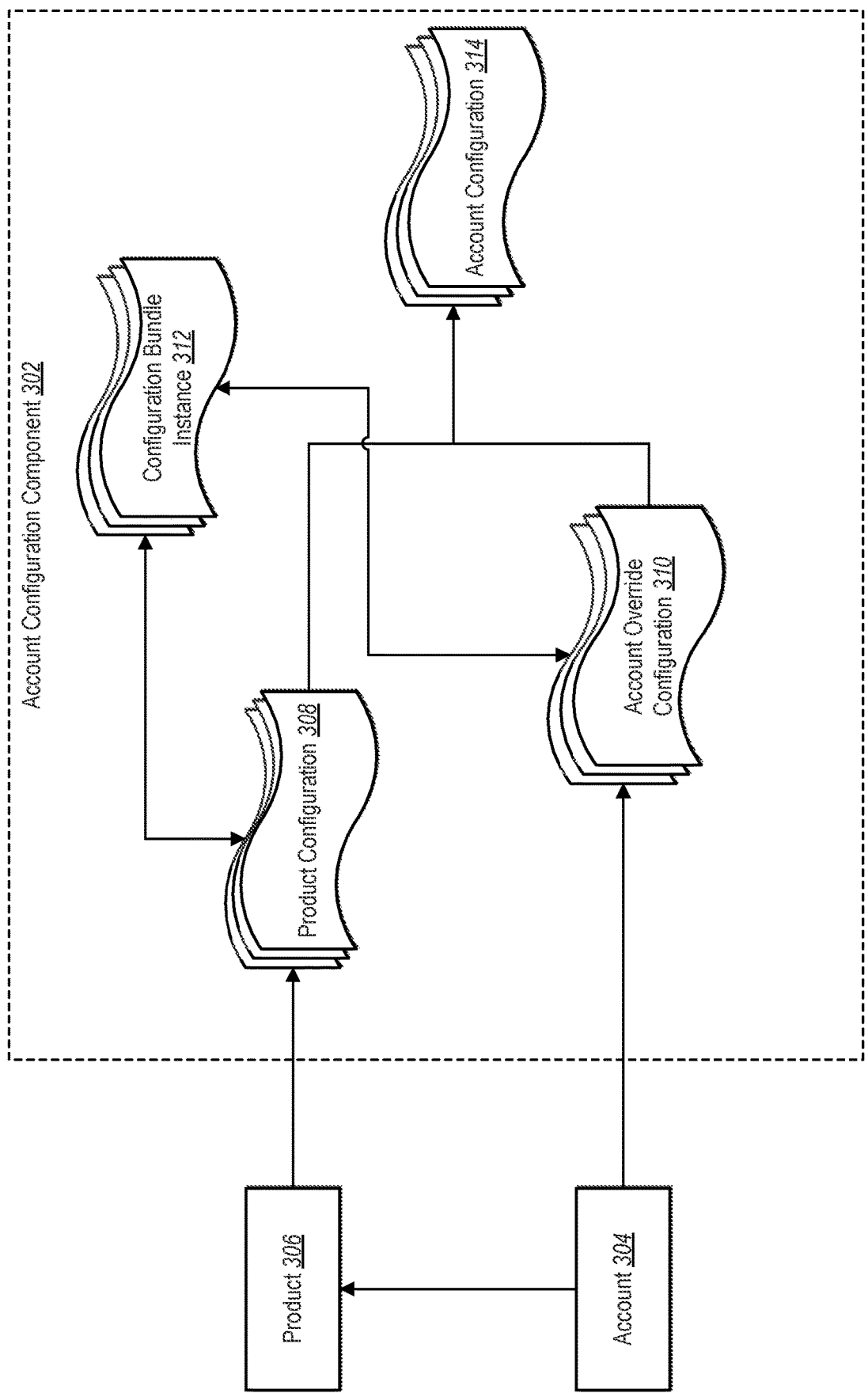
FIG. 3 illustrates an example diagram for generating product configurations and account override configurations using configuration bundle instances in accordance with one or more embodiments.

As mentioned above, in certain described embodiments, the account configurator system 106 generates and utilizes configuration bundle instances to update account attributes more efficiently. In particular, the account configurator system 106 utilizes a particular network component such as an account configuration component to generate and manage account configurations using configuration bundle instances. FIG. 3 illustrates an example diagram for using an account configuration component 302 to generate account configurations in accordance with one or more embodiments.

As illustrated in FIG. 3, the account configurator system 106 generates or defines a configuration bundle instance 312 (and/or one or more additional configuration bundle instances). In some embodiments, the account configurator system 106 defines a configuration bundle instance 312 as defined by one or more administrator device(s) 116. In these or other embodiments, the account configurator system 106 defines the configuration bundle instance 312 by specifying key-value pairs for applying across a number of product configurations and/or account override configurations. Indeed, the account configurator system 106 can determine or identify groups of attributes that are commonly included together within product configurations or account configurations and can use a group of attributes to generate the configuration bundle instance 312. For instance, the account configurator system 106 generates a configuration bundle instance to include groups of key-value pairs that apply to at least a threshold number of accounts and/or products.

In some cases, the account configurator system 106 generates the configuration bundle instance 312 according to a bundle type which defines the schema or structure for the configuration bundle instance 312. For instance, the account configurator system 106 generates or defines the bundle type based on input from one or more administrator device(s) 116. As another example, the account configurator system 106 determines the bundle type by identifying a set of attributes that belong together (e.g., attributes that are included together in a threshold number of product configurations and/or account override configurations) and defining the key names and corresponding schema value types according to the set of attributes. The account configurator system 106 further generates the configuration bundle instance 312 according to the bundle type, including specific values having the formats indicated by respective schema value types.

In some cases, the account configurator system 106 uses a clustering technique (e.g., a clustering machine learning model) to generate clusters of attributes and generates configuration bundle instances from the clusters. For example, the account configurator system 106 clusters attributes by generating, for attributes used in product configurations and/or account override configurations (e.g., across the inter-network facilitation system 104), attribute embeddings (e.g., based on semantics, commonality in shared configurations, frequency of use, and/or other factors) in an embedding space and by grouping the attribute embeddings according to distance relative to one another in the embedding space. In one or more embodiments, the account configurator system 106 stores the configuration bundle instance 312 within a database.

As also illustrated in FIG. 3, the account configurator system 106 identifies an account 304 associated with a product 306. In particular, the account configurator system 106 identifies an account 304 that includes account attributes (e.g., key-value pairs) that indicate various parameters for the account, such as an account identification. The account 304 can also define one or more account override configurations 310 defining account attributes for overriding various product attributes specifically for the identified account (e.g., the account of the account identification). In some cases, the account override configuration 310 can include attributes for overriding one or more portions of the product configuration 308.

In some embodiments, the account configurator system 106 generates or defines the account override configuration 310 to include one or more bundle values (e.g., as values within key-value pairs). Based on defining the account override configuration 310 with a bundle value, the account configurator system 106 further identifies a configuration bundle instance 312 that corresponds to, or is referenced by, the bundle value. In some cases, the configuration bundle instance 312 includes a set of key-value pairs defining additional attributes or parameters, such as withdrawal limits, transfer limits, credit limits, enablement for international transactions, and others. Thus, the account configurator system 106 defines the account override configuration 310 to subsume the key-value pairs of the configuration bundle instance 312 by including the bundle value. The account configurator system 106 stores the account override configuration 310 within a repository or database.

In addition, the account configurator system 106 can identify a product 306 (e.g., a particular type of credit card, a particular type of bank account, or some other type of account) that corresponds to a product configuration 308. For instance, the product configuration 308 defines configuration attributes for the product, including key-value pairs to use as default or baseline attributes within an account configuration (overridable by override attributes from the account override configuration 310). In some cases, a single product (e.g., the product 306) corresponds to a single product configuration (e.g., the product configuration 308).

In some embodiments, the account configurator system 106 generates or defines the product configuration 308 to include a bundle value referencing the configuration bundle instance 312 (or a different configuration bundle instance). As mentioned, the configuration bundle instance 312 includes a set of key-value pairs defining additional attributes or parameters, such as withdrawal limits, transfer limits, credit limits, enablement for international transactions, and others. Thus, the account configurator system 106 defines the product configuration 308 to subsume the key-value pairs of the configuration bundle instance 312 (or a different configuration bundle instance) by including the bundle value. The account configurator system 106 can further store the product configuration 308 within a repository or database.

As further illustrated in FIG. 3, the account configurator system 106 generates an account configuration 314. For example, the account configurator system 106 generates the account configuration 314 in response to a configuration query. The account configurator system 106 can generate the account configuration by identifying baseline attributes from the product configuration 308 and replacing a subset of the baseline attributes (from the product configuration 308) with override attributes defined by the account override configuration 310. Additional detail regarding generating the account configuration 314 is provided below with reference to subsequent figures.

Figure 4:
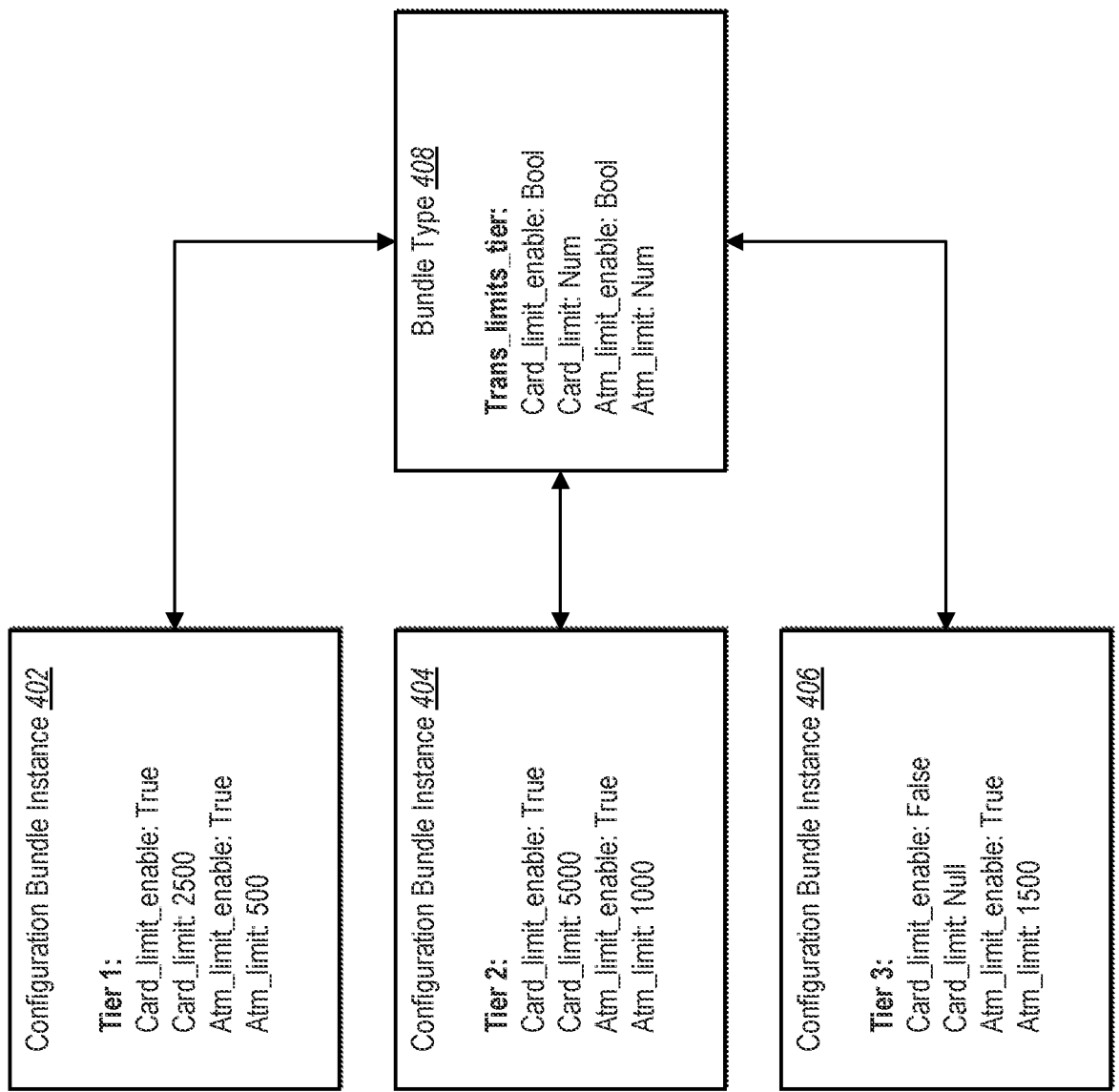
FIG. 4 illustrates example configuration bundle instances based on a bundle type in accordance with one or more embodiments.

As mentioned above, in certain described embodiments, the account configurator system 106 generates multiple configuration bundle instances based on a bundle type. In particular, the account configurator system 106 generates configuration bundle instances defining specific values for key names defined by a bundle type, where the specific values follow the formats set forth in the bundle type. FIG. 4 illustrates example configuration bundle instances based on a bundle type in accordance with one or more embodiments.

As illustrated in FIG. 4, the account configurator system 106 generates or defines configuration bundle instances 402-406 based on a bundle type 408. More particularly, the account configurator system 106 account configurator system 106 identifies, defines, or generates the bundle type 408. For example, the account configurator system 106 defines a name or a bundle category for the bundle type 408 and generates a set of attribute keys and corresponding schema value types to include within the bundle type 408. As shown, the account configurator system 106 assigns a name or label for the bundle type 408: "Trans_limits_tier." As also shown, the account configurator system 106 defines attribute keys, such as: "Card_limit_enable," "Card_limit," "Atm_limit_enable," and "Atm_limit."

As further illustrated in FIG. 4, the account configurator system 106 defines schema value types for the attribute keys of the bundle type 408. To elaborate, the account configurator system 106 determines (as set by one or more administrator device(s) 116) formats or data types corresponding to each of the attribute keys. For example, the account configurator system 106 assigns a Boolean ("Bool") schema value type for the "Card_limit_enable" attribute key. In addition, the account configurator system 106 assigns a number ("Num") schema value type for the "Card_limit" attribute key. Further, the account configurator system 106 assigns a Boolean ("Bool") schema value type for the "Atm_limit_enable" attribute key. The account configurator system 106 also assigns a number ("Num") schema value type for the "Atm_limit" attribute key.

In certain embodiments, the account configurator system 106 can generate a bundle type using particular computer code. For example, the account configurator system 106 can define a bundle type (e.g., the bundle type 408) for transaction limit tiers based on the following pseudo code:

```
bundle_schema["transaction_limits_tier"] = {
    card_spend_daily_limit_enabled: bool,
    card_spend_daily_limit: number,
    atm_withdrawal_daily_limit_enabled: bool,
    atm_withdrawal_daily_limit: number,
    max_gas_station_preauthorization_limit: number,
}.
```

In like fashion, the account configurator system 106 can generate bundle types for different accounts and/or products. For example, the account configurator system 106 can generate a bundle type for a new credit card to add to the inter-network facilitation system 104. In some cases, the account configurator system 106 defines the new card product according to the following pseudo code:

```
bundle_schema["card_product"] = {
    new_card_bin: string,
    new_card_vendor_id: string,
    new_card_stock_id: string,
    new_card_program_id: string,
    new_card_collateral_id: string,
    new_card_image_id: string,
}.
```

As shown, the account configurator system 106 generates or defines the configuration bundle instance 402 from the bundle type 408. Indeed, the account configurator system 106 assigns a name or label for the 4 configuration bundle instance 402 ("Tier 1"), and the account configurator system 106 includes or adds attribute keys to match those of the bundle type 408. The account configurator system 106 further defines specific values (rather than generic schema value types) for each of the attribute keys, where each value adheres to the corresponding schema value type of the bundle type 408. As shown in the configuration bundle instance 402, the account configurator system 106 defines the Tier 1 configuration of account transaction limit tiers to reflect amounts set by the inter-network facilitation system 104 and/or the third party processing server(s) 112 ("Trans_limits_tier") to: 1) enable a card limit ("Card_limit_enable: True"), 2) set the card limit to $2500 ("Card_limit: 2500"), 3) enable an ATM limit ("Atm_limit_enable: True"), and 4) set the ATM limit to $500 ("Atm_limit: 500"). In one or more embodiments, the account configurator system 106 can generate the configuration bundle instance 402 for Tier 1 account limits according to the following pseudo code:

```
CreateBundle(schema="transaction_limits_tier", name="tier_1", {
    card_spend_daily_limit_enabled: true,
    card_spend_daily_limit: 2500,
    atm_withdrawal_daily_limit_enabled: true,
    atm_withdrawal_daily_limit: 500,
    max_gas_station_preauthorization_limit: 50,
}).
```

Likewise, the account configurator system 106 also generates the configuration bundle instance 404 and the configuration bundle instance 406 in a similar fashion. For example, the account configurator system 106 generates the configuration bundle instance 404 with the name "Tier 2." The account configurator system 106 further defines the configuration attributes of the configuration bundle instance 404 to set attributes for tier 2 account limits using key-value pairs. For instance, the account configurator system 106 sets the attributes according to the following: 1) enable a card limit ("Card_limit_enable: True"), 2) set the card limit to $5000 ("Card_limit: 5000"), 3) enable an ATM limit ("Atm_limit_enable: True"), and 4) set the ATM limit to $1000 ("Atm_limit: 1000"). In some cases, the account configurator system 106 generates the configuration bundle instance 404 according to the following pseudo code:

```
CreateBundle(schema="transaction_limits_tier", name="tier_2", {
    card_spend_daily_limit_enabled: true,
    card_spend_daily_limit: 5000,
    atm_withdrawal_daily_limit_enabled: true,
    atm_withdrawal_daily_limit: 1000,
    max_gas_station_preauthorization_limit: 50,
}).
```

The account configurator system 106 can further generate or define the configuration attributes of the configuration bundle instance 406 to set attributes for tier 3 account limits using key-value pairs. For instance, the account configurator system 106 sets the attributes according to the following: 1) enable a card limit ("Card_limit_enable: False"), 2) not set a card limit ("Card_limit: Null"), 3) enable an ATM limit ("Atm_limit_enable: True"), and 4) set the ATM limit to $1500 ("Atm_limit: 1500").

In certain cases, the account configurator system 106 generates configuration bundle instances for different sets of attributes, beyond transaction limit tiers. For example, the account configurator system 106 generates a configuration bundle instance for a particular product, such as a specific credit card or debit card. The account configurator system 106 can generate the configuration bundle instance for a specific debit card using the "card_product" bundle type (defined above) according to the following pseudo code:

```
CreateBundle(schema="card_product",
name="stride_debit_fiserv_white", {
    new_card_bin: "486208",
    new_card_vendor_id: "V00037",
    new_card_stock_id: "Z07CS002",
    new_card_program_id: "365ac104-8569-4835-af60-bdf48c60e0dd",
})
``` where the attribute keys of "new_card_bin," "new_card_vendor_id," "new_card_stock_id," and "new_card_program_id" correspond respectively to the indicated values.

In one or more embodiments, the account configurator system 106 detects or receives an update to one or more of the configuration bundle instances 402-406. For example, the account configurator system 106 receives an update from one or more administrator device(s) 116. Specifically, the account configurator system 106 receives an update to modify one or more attribute keys (e.g., by changing the name or label of the keys) and/or to update or modify one or more values. In response to the update, the account configurator system 106 applies the update to the corresponding configuration bundle instance, whereupon other configurations (e.g., product configurations and account override configurations) that reference or call the configuration bundle instance will automatically (e.g., without further input to expressly change) reflect the change.

As an example, the account configurator system 106 receives an update to the configuration bundle instance 402. Specifically, the account configurator system 106 receives an update to change the value of the "Card_limit" key from 2500 to 3000. Thus, upon modifying the value for the "Card_limit" key from 2500 to 3000, the account configurator system 106 automatically applies or propagates the change to product configurations and/or account override configurations that reference the configuration bundle instance 402.

Figure 5:
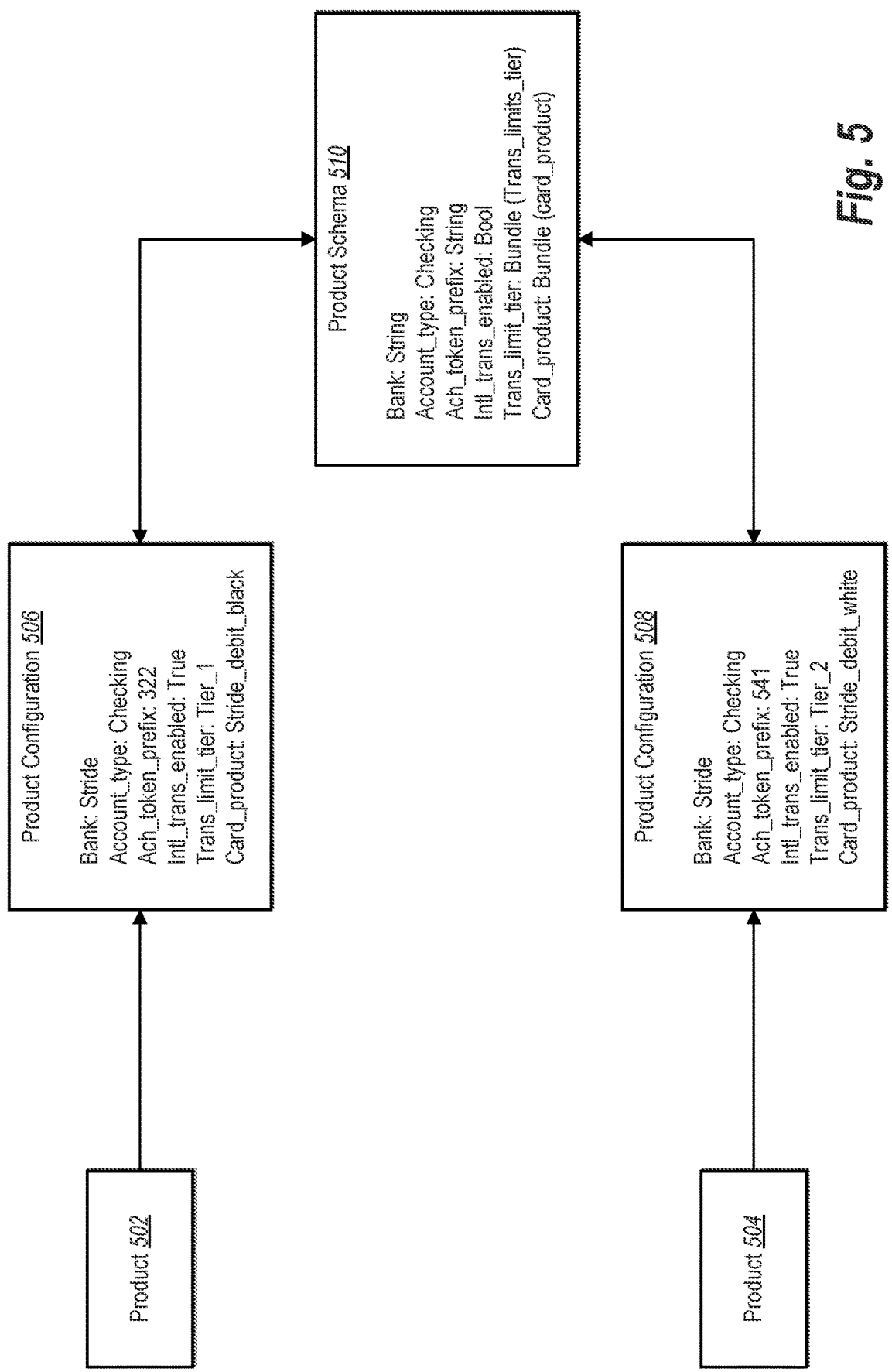
FIG. 5 illustrates example product configurations based on a product schema in accordance with one or more embodiments.

As mentioned above, in certain described embodiments, the account configurator system 106 generates or defines product configurations to use as default or baseline attribute sets for various account configurations. In particular, the account configurator system 106 generates a product configuration that includes key-value pairs according to a product schema. FIG. 5 illustrates example product configurations generated according to a product schema in accordance with one or more embodiments.

As illustrated in FIG. 5, the account configurator system 106 generates product configurations 506-508 from the product schema 510. In particular, the account configurator system 106 generates the product configuration 506 to reflect configuration attributes for a product 502. In addition, the account configurator system 106 generates the product configuration 508 to reflect configuration attributes for a product 504. As shown, the product configuration 506 and the product configuration 508 include their own sets of key-value pairs, where one or more key-value pairs reference a configuration bundle instance.

To generate the product configurations 506-508, the account configurator system 106 utilizes the product schema 510. Indeed, the account configurator system 106 determines the product schema 510 (as set by one or more administrator device(s) 116) to dictate the structure for attributes of the product configurations 506-508. As shown, the account configurator system 106 defines the product schema 510 to include attribute keys and value types, such as a "Bank" key corresponding to a "String" value, an "Account type" key corresponding to a "Checking" value, and so on. As further shown, the product schema 510 indicates a (value referencing a) particular bundle type for a "Trans_limits_tier" key, namely the "Bundle (Trans_limits_tier)" defined above, to set the structure for the attributes of the "Trans_limits_tier" key. Likewise, the "Card_product" key corresponds to a "Bundle (card_product)" bundle type. In one or more embodiments, the account configurator system 106 generates or determines the product schema 510 according to the following pseudo code:

```
configuration_schema = {
    bank: "stride" | "bancorp" OR string,
    account_type: "checking" | "unsecured_credit",
    ach_token_prefix_for_new_account: string,
    international_transactions_enabled: bool,
    credit_limit_enabled: bool,
    credit_limit: number,
    transaction_limits_tier: bundle("transaction_limits_tier"),
    card_product: bundle("card_product"),
}
``` where each line item reflects a key-value pair with the key on the left of the colon and a corresponding value on the right of the colon.

According to the product schema 510, the account configurator system 106 defines key-value pairs for the product configurations 506-508. For example, the account configurator system 106 defines the product configurations 506-508 to reflect specific values (having data types defined by the product schema 510 and) corresponding to the keys set forth in the product schema 510. As shown, the account configurator system 106 generates the product configuration 506 to include bundle values that reference the "Tier 1" configuration bundle instance as well as the "Stride_debit_black" configuration bundle instance. The account configurator system 106 further generates the product configuration 508 to include bundle values that reference the "Tier 2" configuration bundle instance as well as the "Stride_debit_ white" configuration bundle instance. Thus, by incorporating the attributes of the respective configuration bundle instances, the product configuration 508 has higher transaction limits than the product configuration 506.

In certain cases, the account configurator system 106 defines a product configuration according to the following pseudo code:

```
CreateProduct({
    bank: "stride",
    account_type: "checking",
    ach_token_prefix_for_new_account: "342",
    international_transactions_enabled: true,
    credit_limit_enabled: false,
    transaction_limits_tier: "tier_1",
    card_product: "stride_debit_fiserv_white"
}).
```

If a product (e.g., the product 502 or 504) does not need a particular value because the corresponding network component that requests an account configuration is not applicable to the value, then the account configurator system 106 can set omit the value. Specifically, the account configurator system 106 can set the value to "null," which can result in pseudo code similar to the following:

```
CreateProduct({
    bank: "stride",
    account_type: "savings",
    ach_token_prefix_for_new_account: "555",
})
``` where values for several keys (e.g., "international_transactions_enabled," "credit_limit_enabled," and so on) have been set to "null" and have therefore been omitted.

In one or more embodiments, the account configurator system 106 receives or detects an update to a configuration bundle instance referenced by the product configuration 506 or the product configuration 508. For example, the account configurator system 106 receives input from one or more administrator device(s) 116 to modify the "Tier 1" configuration bundle instance, the "Tier 2" configuration bundle instance, the "Stride_debit_black" configuration bundle instance, and/or the "Stride_debit_white" configuration bundle instance. Based on the update, the account configurator system 106 modifies the attributes of the product configuration 506 and/or the product configuration 508 to reflect those of the updated configuration bundle instance.

Figure 6:
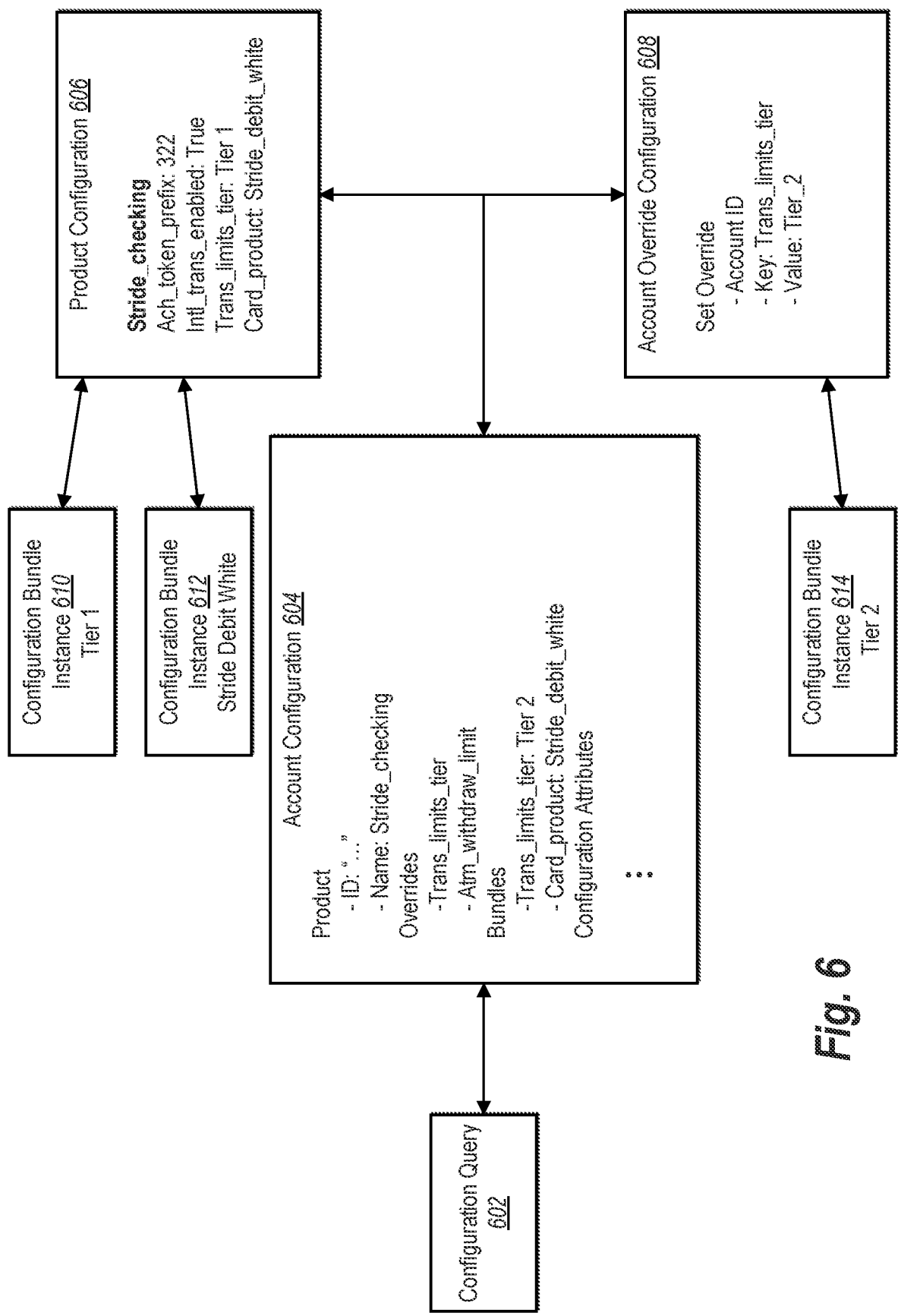
FIG. 6 illustrates an example diagram for generating an account configuration for a configuration query in accordance with one or more embodiments.

As mentioned above, in certain described embodiments, the account configurator system 106 receives a configuration query requesting an account configuration. In particular, the account configurator system 106 receives a configuration query from a network component of the inter-network facilitation system 104 or from one of the third-party processing server(s) 112. FIG. 6 illustrates an example diagram for generating an account configuration in response to a configuration query in accordance with one or more embodiments.

As illustrated in FIG. 6, the account configurator system 106 identifies or receives a configuration query 602. In particular, the account configurator system 106 receives the configuration query from a network component (e.g., an ACH processor, a card transaction processor, or an account transfer processor) or from a third-party processing server(s) 112. The account configurator system 106 identifies various data or information from the configuration query 602, such as an account identification specifying the account for which to generate and provide an account configuration.

In response to receiving the configuration query 602, the account configurator system 106 generates an account configuration 604 for the requested/queried account. For example, the account configurator system 106 generates the account configuration 604 to provide (configuration attributes of a queried account) to the requesting network component or third-party processing server(s) 112. To generate the account configuration 604, the account configurator system 106 analyzes a database of product configurations and/or account override configurations to identify and select product configurations and/or account override configurations that are associated with the requested/queried account.

To elaborate, the account configurator system 106 identifies a product configuration 606 that corresponds to the configuration query 602 by determining that the product configuration includes an account identifier that matches the identifier of the requested/queried account. For example, the account configurator system 106 identifies a value of "322" for an "Ach_token_prefix" key, where the value of "322" matches the "Ach_token_prefix" key indicated by the configuration query 602. Thus, the account configurator system 106 (preliminarily or intermediately) extracts and assigns the attributes of the product configuration 606 to the requested/queried account. For instance, the account configurator system 106 assigns the key-value pairs of the "Stride checking" product as illustrated in FIG. 6.

Specifically, the account configurator system 106 determines that the product configuration 606 references or calls two different configuration bundle instances: the configuration bundle instance 610 and the configuration bundle instance 612. Indeed, the account configurator system 106 analyzes the product configuration 606 to identify, for the "Trans_limits_tier" key, a "Tier 1" bundle value that calls the Tier 1 configuration bundle instance—the configuration bundle instance 610. In addition, the account configurator system 106 determines that the "Card_product" key references the "Stride_debit_white" bundle value, thereby calling the attributes of the Stride Debit White configuration bundle instance (the configuration bundle instance 612) into the product configuration 606.

As further illustrated in FIG. 6, the account configurator system 106 determines that the requested/queried account indicated by the configuration query 602 corresponds to an account override configuration 608. For example, the account configurator system 106 analyzes a database of account override configurations to identify the account override configuration 608 stored for the requested/queried account. Accordingly, the account configurator system 106 utilizes the account override configuration 608 to replace, supersede, or override one or more attributes of the product configuration 606. Thus, in generating the account configuration 604, the account configurator system 106 uses the override attributes of the account override configuration 608 in place of corresponding (preliminary) product attributes from the product configuration 606.

More specifically, the account configurator system 106 determines that the account override configuration 608 includes override attributes for specified keys. As shown, the account configurator system 106 identifies the attribute key "Trans_limits_tier" which corresponds to the attribute key of the same name in the product configuration 606. Accordingly, the account configurator system 106 replaces the bundle value of "Tier_1" from the product configuration 606 with the bundle value of "Tier_2" as indicated by the account override configuration 608.

Accordingly, as shown in FIG. 6, the account configurator system 106 extracts and applies the attributes for the configuration bundle instance 614 for Tier 2 account limits to replace those of the configuration bundle instance 610 in generating the account configuration 604. For example, the account configurator system 106 can modify an account associated with a user profile to move the user profile to a different account limits tier. In one or more cases, the account configurator system 106 sets override attributes for temporary, one time use (e.g., for a single transaction or event). In other cases, the account configurator system 106 sets permanent overrides from the account override configuration 608. The account configurator system 106 can also (or alternatively) set timed overrides by determining future dates and times to apply the account override configuration 608. In some embodiments, the account configurator system 106 utilizes an account override configuration according to the following pseudo code:

SetOverride(some_account_id,
key="transaction_limits_tier", value="tier_2").

In some cases, the account configurator system 106 replaces values other than bundle values using an account override configuration. Specifically, the account configurator system 106 uses an account override configuration to replace individual attributes, as opposed to replacing sets or groups of attributes from configuration bundle instances. For example, the account configurator system 106 can use an account override configuration given by the following pseudo code:

SetOverride(some_account_id, "transaction_limits_tier.atm_withdrawal_daily_limit", 1500)

to set the ATM withdrawal limit for some account ID to $1500 (from some other default value of a product configuration).

Based on identifying the product configuration 606 and the account override configuration 608, the account configurator system 106 generates the account configuration 604. Indeed, the account configurator system 106 generates the account configuration 604 to include attributes (key-value pairs) from the product configuration 606, including attributes from the configuration bundle instance 612 referenced by product configuration 606. Additionally, the account configurator system 106 generates the account configuration 604 to include attributes (key-value pairs) from the account override configuration 608, including attributes from the configuration bundle instance 614 referenced by the account override configuration 608. In some cases, the account configurator system 106 generates the account configuration 604 according to the following pseudo code:

```
{
    product: {
        id: "...",
        name: "stride_checking",
    },
    overrides: [
        "transaction_limits_tier.atm_withdrawal_daily_limit"
    ],
```

-continued

```
bundles: {
  "transaction_limits_tier": "tier_2",
  "card_product": "stride_debit_fiserv_white",
},
configuraton_attributes: {
  bank: "stride",
  account_type: "checking",
  international_transactions_enabled: true,
  ach_token_prefix_for_new_account: "342",
  // values from the tier_2 bundle
  transaction_limits_tier.card_spend_daily_limit_enabled: true,
  transaction_limits_tier.card_spend_daily_limit: 5000,
  transaction_limits_tier.atm_withdrawal_daily_limit_enabled: true,
  transaction_limits_tier.atm_withdrawal_daily_limit: 1500, // from override
  transaction_limits_tier.max_gas_station_preauthorization_limit: 50,
  // values from the card bundle
  card_product.new_card_bin: "486208",
  card_product.new_card_vendor_id: "V00037",
  card_product.new_card_stock_id: "Z07CS002",
  card_product.new_card_program_id: "365ac104-8569-4835-af60bdf48c60e0dd",
}
```

Based on generating the account configuration 604, the account configurator system 106 provides the account configuration 604 to the requesting network component or third party processing server(s) 112.

Figure 7:
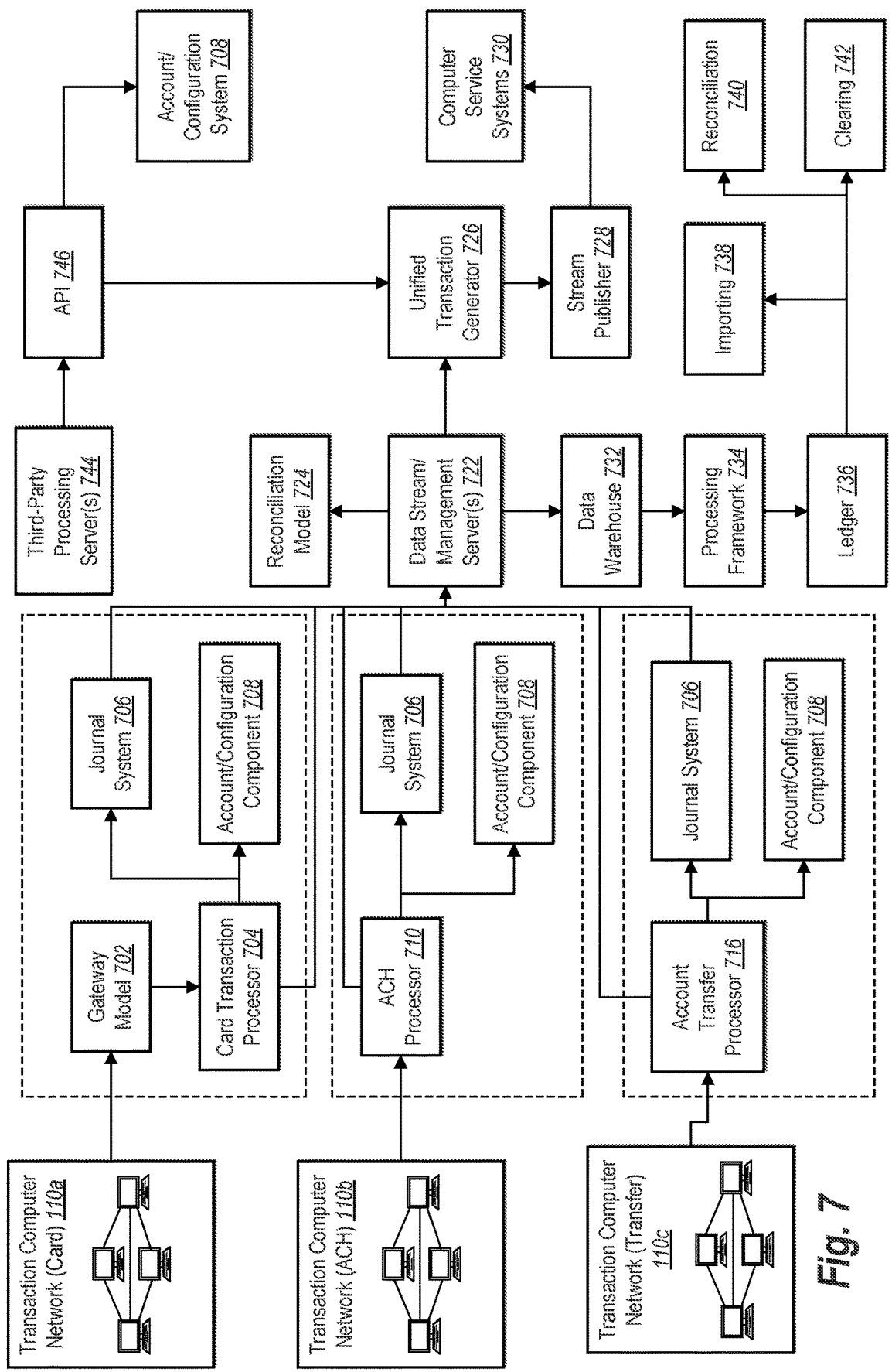
FIG. 7 illustrates an example schematic diagram of a computer platform for implementing an account configurator system in accordance with one or more embodiments

As mentioned above, in certain described embodiments, the account configurator system 106 utilizes an account configuration component as part of a processing platform within the inter-network facilitation system 104. For example, FIG. 7 illustrates a platform in which the account configurator system 106 operates in accordance with one or more embodiments. Indeed, FIG. 7 illustrates the transaction computer networks 110a-110c providing transaction information corresponding to different transaction types (e.g., card, ACH, or transfer transactions). The inter-network facilitation system 104 receives and processes this transaction information utilizing a variety of computer implemented models and procedures.

For example, as shown in FIG. 7, the inter-network facilitation system 104 utilizes a gateway model 702 to analyze transaction information from the transaction computer network 110a (e.g., a card transaction computer network). The gateway model 702 performs an initial analysis of the transaction information (e.g., accepts or rejects the transaction based on gateway criteria). Moreover, the inter-network facilitation system 104 also analyzes the transaction information utilizing the card transaction processor 704. In one or more embodiments, the card transaction processor 704 extracts and analyzes information for the inter-network facilitation system 104. For example, in some embodiments, the card transaction processor 704 transforms and converts information from the transaction computer network 110a for further analysis within the inter-network facilitation system 104. In some embodiments, the card transaction processor 704 assists in converting a network schema to a unified transaction schema, as described above (e.g., utilizing a unified transaction model).

As shown, the card transaction processor 704 also communicates with a journal system and an account/configuration component 708. For example, the account/configuration component 708 can verify that the inter-network facilitation system 104 has an account corresponding to the transaction information, whether the account has funds for the transaction, etc. Moreover, the account/configuration component 708 can determine account configurations corresponding to the transaction, as described above. The journal system 706 tracks and manages asset movement for a transaction. For example, the journal system 706 records asset movement for accounts corresponding to transactions.

As shown, the journal system 706 and/or the card transaction processor 704 emit transaction information, such as events, to data management server(s) 722. The data management server(s) 722 can store, process, provide, and/or report transaction information. For example, as illustrated, the data management server(s) 722 can provide transaction information to a reconciliation model 724 (e.g., to reconcile transaction information with the transaction computer network 110a). Similarly, the data management server(s) 722 can provide transaction information to a data warehouse 732 for further processing (via the processing framework 734) entry into a ledger 736 (or system of record), and further analysis via importing 738 (e.g., bank/entity importing), reconciliation 740 (e.g., reconciliation of the ledger or system of record), or clearing 742 processes/models. Indeed, in one or more embodiments, the journal system 706 exports transaction information (via the data management server(s) 722, and the data warehouse 732) to maintain a system of record for transactions across the inter-network facilitation system 104.

The inter-network facilitation system 104 performs similar functions with regard to the transaction computer networks 110b, 110c (e.g., ACH transaction computer networks and transfer transaction computer networks). As shown, the inter-network facilitation system 104 utilizes an ACH processor 710 to process transaction information from the transaction computer network 110b (e.g., similar to the card transaction processor 704). Moreover, the inter-network facilitation system 104 utilizes the journal system 706 and the account/configuration component 708 to transmit transaction events to the data management server(s) 722. Similarly, the inter-network facilitation system 104 utilizes an account transfer processor 716 to process transaction information from the transaction computer network 110c (e.g., similar to the card transaction processor 704). Moreover, the inter-network facilitation system 104 utilizes the journal system 706 and the account/configuration component 708 to transfer transaction events corresponding to the transaction computer network 110c to the data management server(s) 722.

As shown in FIG. 7, the inter-network facilitation system 104 utilizes a unified transaction generator 726 (e.g., the unified transaction model of the account configurator system 106) to generate unified transaction containers for individual transactions. As shown, the unified transaction generator 726 can combine transaction information from different transaction computer networks 110*a*-110*c*. As shown, the unified transaction generator 726 can also generate unified transaction containers from transaction information received from third-party processing server(s) 744.

For example, the third-party processing server(s) 744 can work in conjunction with the inter-network facilitation system 104 to provide additional bandwidth, throughput, or redundancy in processing transactions from the transaction computer networks 110*a*-110*c*. In some implementations, the third-party processing server(s) 744 receive and process transaction information. The inter-network facilitation system 104 can utilize an API 746 to import the transaction information (and utilize the account/configuration component 708 to verify account information and obtain account configurations to feed the transaction information through the remainder of the inter-network facilitation system 104). The unified transaction generator 726 receives this transaction information and generates unified transaction containers (e.g., by converting the transaction information, if necessary, and populating unified transaction containers with pertinent information extracted from the transaction information).

Moreover, the inter-network facilitation system 104 publishes a unified transaction stream utilizing a stream publisher 728. As show, the stream publisher 728 provides the unified transaction stream to computer service systems 730. Thus, the unified transaction stream can include information from the transaction computer networks 110*a*-110*c* and information from the third-party processing server(s) 744.

The components of the account configurator system 106 can include software, hardware, or both. For example, the components of the account configurator system 106 can include one or more instructions stored on a computer-readable storage medium and executable by processors of one or more computing devices (e.g., the server device(s) 102, the client device(s) 118, the administrator device(s) 116, and/or the transaction computer network device(s) 110*a*-110*c*). When executed by the one or more processors, the computer-executable instructions of the account configurator system 106 can cause a computing device to perform the methods described herein. Alternatively, the components of the account configurator system 106 can comprise hardware, such as a special purpose processing device to perform a certain function or group of functions. Additionally or alternatively, the components of the account configurator system 106 can include a combination of computer-executable instructions and hardware.

Furthermore, the components of the account configurator system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the account configurator system 106 may be implemented as part of a stand-alone application on a personal computing device or a mobile device. Alternatively or additionally, the components of the account configurator system 106 may be implemented in any application that allows creation and delivery of financial and/or marketing content to users, including, but not limited to, various applications.

FIGS. 1-7, the corresponding text, and the examples provide a number of different systems, methods, and non-transitory computer readable media for generating account configurations using configuration bundle instances. In addition to the foregoing, embodiments can also be described in terms of flowcharts comprising acts for accomplishing a particular result. For example, FIG. 8 illustrates a flowchart of an example sequence of acts in accordance with one or more embodiments.

Figure 8:
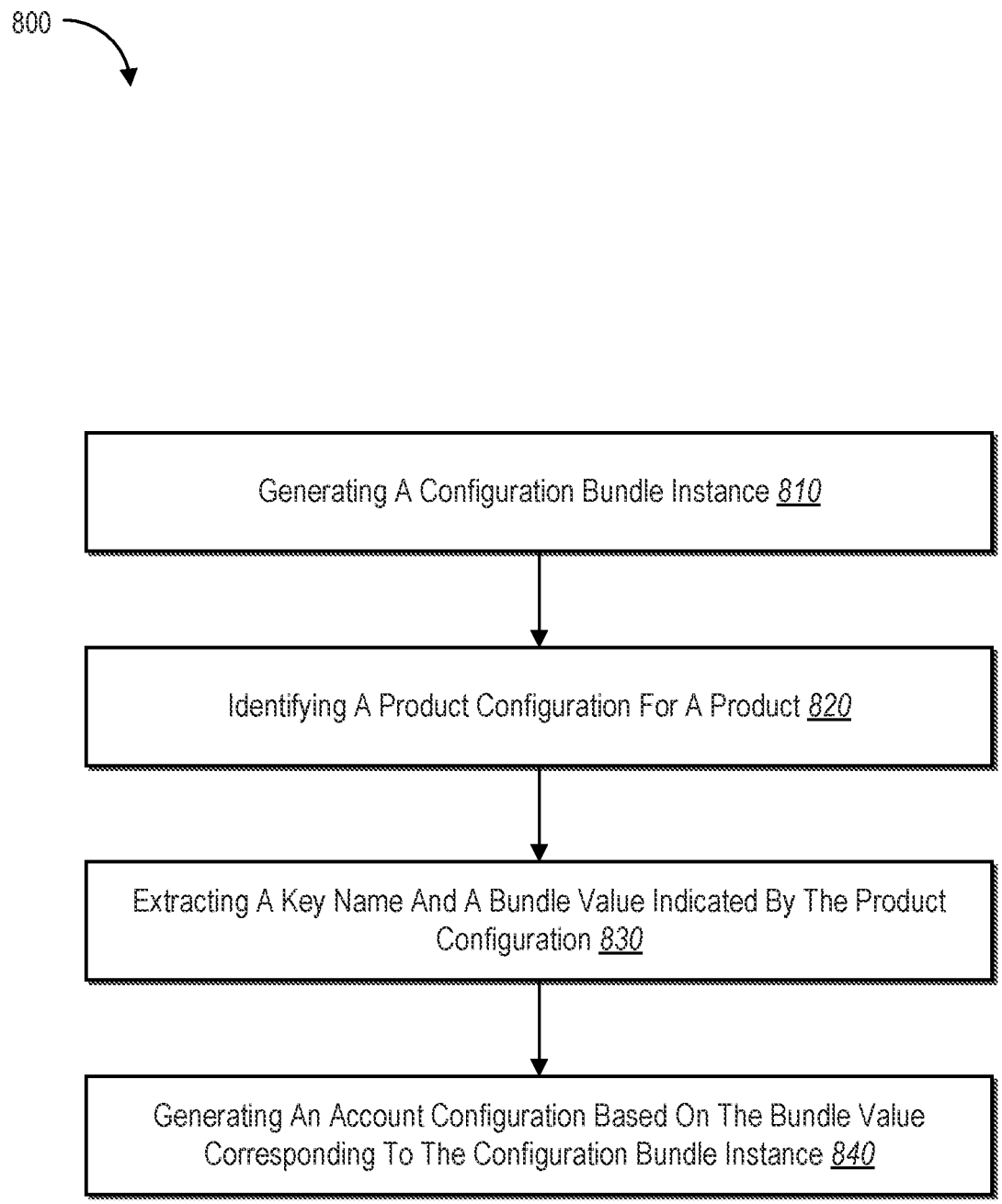
FIG. 8 illustrates an example series of acts for generating an account configuration using configuration bundle instances in accordance with one or more embodiments.

While FIG. 8 illustrates acts according to some embodiments, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8. Additionally, the acts described herein may be repeated or performed in parallel with one another or in parallel with different instances of the same or other similar acts.

FIG. 8 illustrates an example series of acts 800 for generating account configurations using configuration bundle instances. The series of acts 800 can include acts 810-840. The act 810 can involve generating a configuration bundle instance. The act 820 can involve identifying a product configuration for a product. The act 830 can involve extracting a key name and a bundle value indicated by the product configuration. The act 840 can involve generating an account configuration based on the bundle value corresponding to the configuration bundle instance.

In one or more embodiments, the series of acts 800 includes an act of generating a configuration bundle instance comprising a set of attribute key-value pairs. The series of acts 800 can also include an act of, in response to receiving a configuration query from a network component of an inter-network facilitation system for an account configuration corresponding to a product, identifying a product configuration for the product comprising a key-value pair. Further, the series of acts 800 can include an act of extracting a key name and a bundle value corresponding to the configuration bundle instance from the key-value pair. Additionally, the series of acts 800 can include an act of, based on extracting the key name and the bundle value, generating the account configuration for the network component by extracting the set of attribute key-value pairs from the configuration bundle instance.

In some embodiments, the series of acts 800 includes an act of generating a bundle type comprising attribute keys and schema value types. In these or other embodiments, the series of acts 800 includes an act of generating the configuration bundle instance by defining values for the attribute keys to generate the set of attribute key-value pairs according to the schema value types. Additionally, the series of acts 800 can include an act of generating an additional configuration bundle instance by defining additional values for the attribute keys according to the schema value types to generate an additional set of attribute key-value pairs different from the set of attribute key-value pairs of the configuration bundle instance.

In certain cases, the series of acts 800 includes an act of generating an account override configuration comprising an additional key-value pair comprising the key name and a different bundle value corresponding to the additional configuration bundle instance. In addition, the series of acts 800 can include an act of, in response to receiving an additional configuration query from one or more network components, extracting the different bundle value corresponding to the key name from the additional key-value pair of the account override configuration. The series of acts 800 can also include an act of generating an additional account configuration for the one or more network components by extracting, based on the account override configuration, the additional set of attribute key-value pairs from the additional configuration bundle instance.

In some embodiments, the series of acts 800 includes an act of generating the product configuration for the product by generating the key-value pair comprising the key name and the bundle value and an additional key-value pair comprising a key name and an attribute value. Further, the series of acts 800 can include an act of modifying the configuration bundle instance to reflect a modified set of attribute key-value pairs. Additionally, the series of acts 800 can include an act of, in response to receiving an additional configuration query for the account configuration corresponding to the product, generating the account configuration by extracting the modified set of attribute key-value pairs referenced by the bundle value of the product configuration.

In some cases, the series of acts 800 can include an act of extracting the set of attribute key-value pairs from the configuration bundle instance referenced by the bundle value of the key-value pair. The series of acts 800 can also include an act of extracting additional key-value pairs defined by the product configuration. Further, the series of acts 800 can include an act of combining the set of attribute key-value pairs from the configuration bundle instance and the additional key-value pairs from the product configuration.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
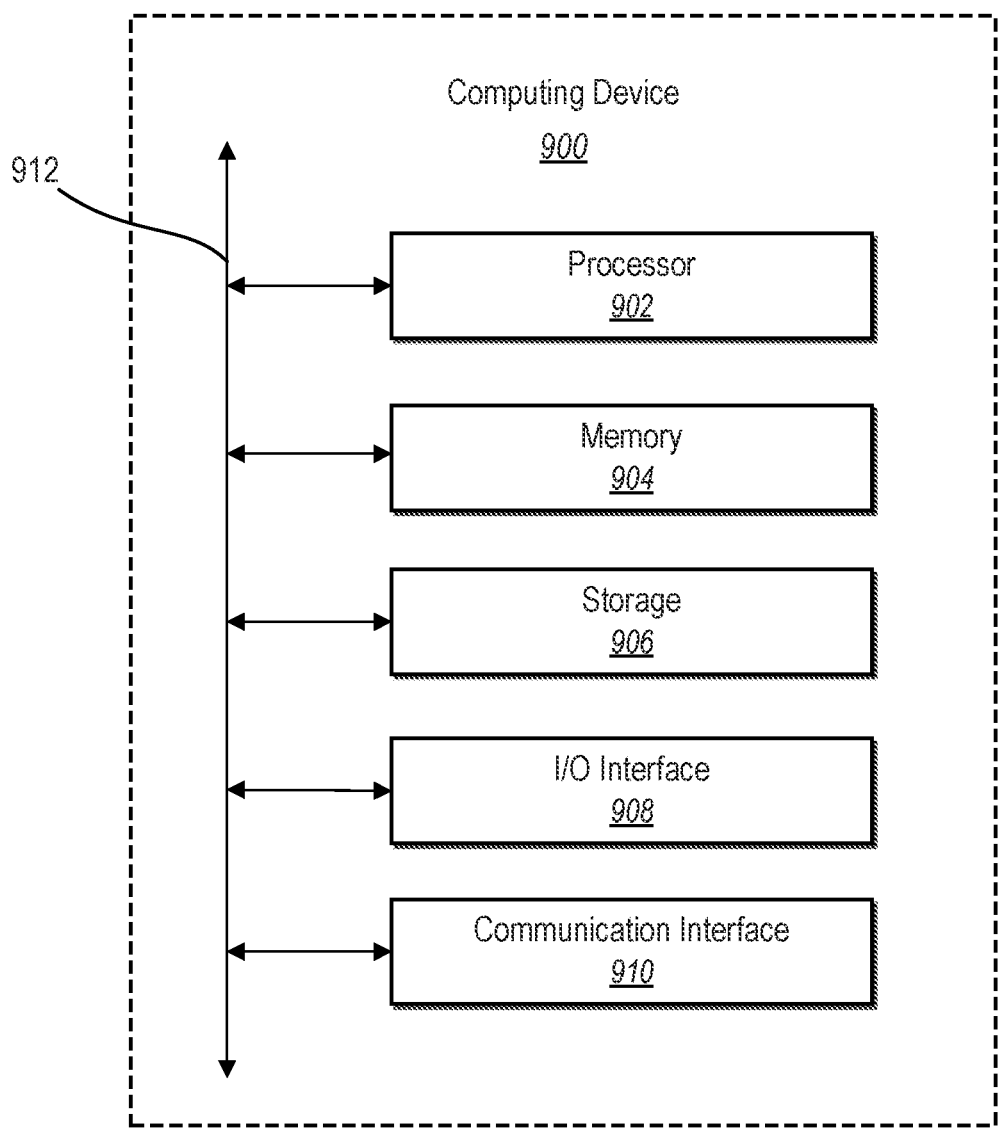
FIG. 9 illustrates a block diagram of a computing device for implementing one or more embodiments of the present disclosure.

FIG. 9 illustrates, in block diagram form, an exemplary computing device 900 (e.g., the client device(s) 118, the administrator device(s) 116, the transaction computer network devices 110a-110c, or the server device(s) 102) that may be configured to perform one or more of the processes described above. As shown by FIG. 9, the computing device can comprise a processor 902, memory 904, a storage device 906, an I/O interface 908, and a communication interface 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, storage device 906 can comprise a non-transitory storage medium described above. The storage device 906 may include a hard disk drive ("HDD"), flash memory, a Universal Serial Bus ("USB") drive or a combination of these or other storage devices.

The computing device 900 also includes one or more input or output interface 908 (or "I/O interface 908"), which are provided to allow a user (e.g., requester or provider) to provide input to (such as user strokes), receive output from, and otherwise transfer data to and from the computing device 900. These I/O interface 908 may include a mouse, keypad or a keyboard, a touch screen, camera, optical scanner, network interface, modem, other known I/O devices or a combination of such I/O interface 908. The touch screen may be activated with a stylus or a finger.

The I/O interface 908 may include one or more devices for presenting output to a user, including, but not limited to, a graphics engine, a display (e.g., a display screen), one or more output providers (e.g., display providers), one or more audio speakers, and one or more audio providers. In certain embodiments, interface 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include a bus 912. The bus 912 can comprise hardware, software, or both that connects components of computing device 900 to each other.

Figure 10:
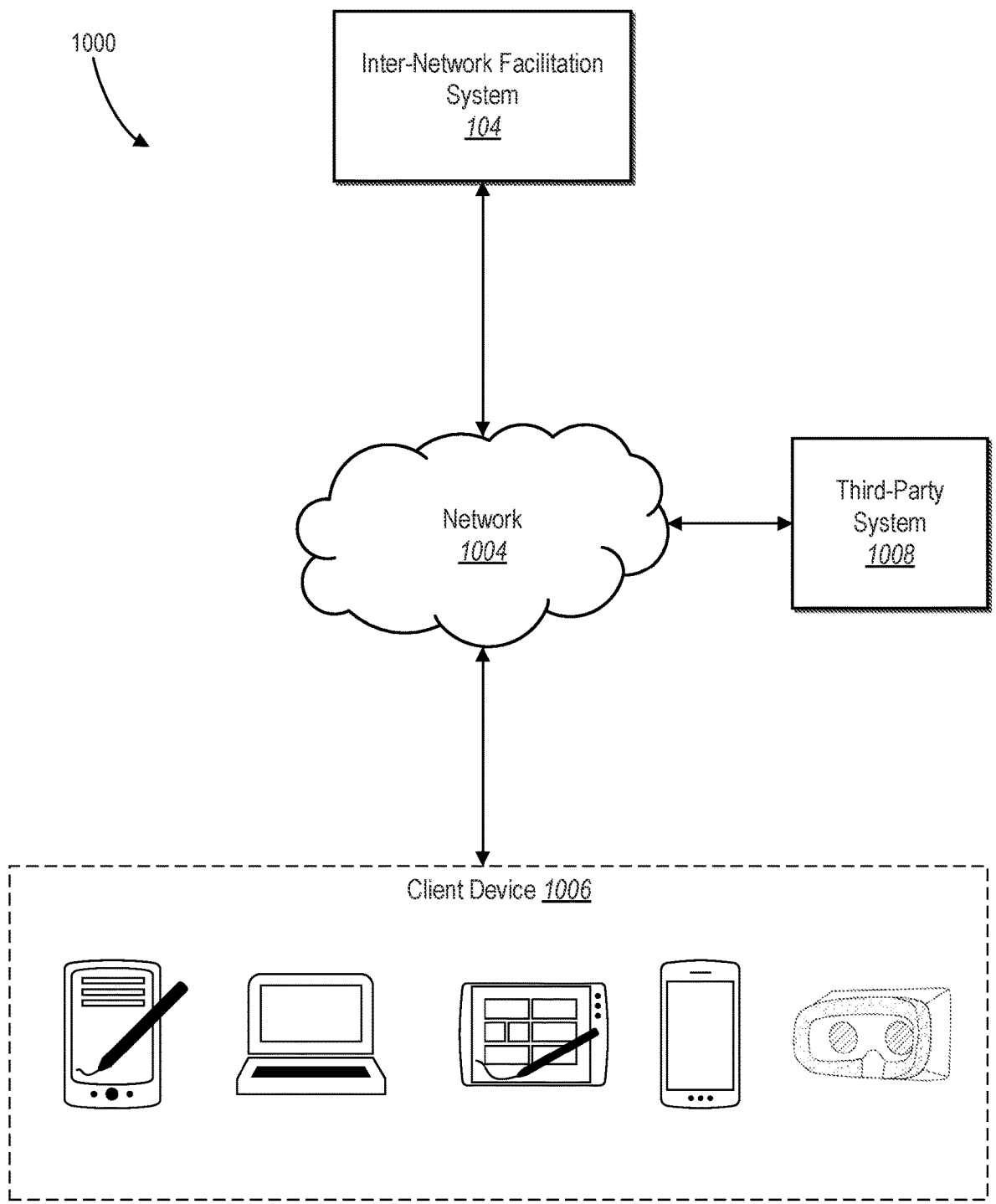
FIG. 10 illustrates an example environment for an inter-network facilitation system in accordance with one or more embodiments.

FIG. 10 illustrates an example network environment 1000 of the inter-network facilitation system 104. The network environment 1000 includes a client device 1006 (e.g., the client device 118, administrator device(s) 116, and/or the transaction computer network device(s) 110a-110c), an inter-network facilitation system 104, and a third-party system 1008 (e.g., the third-party processing server(s) 112) connected to each other by a network 1004. Although FIG. 10 illustrates a particular arrangement of the client device 1006, the inter-network facilitation system 104, the third-party system 1008, and the network 1004, this disclosure contemplates any suitable arrangement of client device 1006, the inter-network facilitation system 104, the third-party system 1008, and the network 1004. As an example, and not by way of limitation, two or more of client device 1006, the inter-network facilitation system 104, and the third-party system 1008 communicate directly, bypassing network 1004. As another example, two or more of client device 1006, the inter-network facilitation system 104, and the third-party system 1008 may be physically or logically co-located with each other in whole or in part.

Moreover, although FIG. 10 illustrates a particular number of client devices 1006, inter-network facilitation systems 104, third-party systems 1008, and networks 1004, this disclosure contemplates any suitable number of client devices 1006, inter-network facilitation system 104, third-party systems 1008, and networks 1004. As an example, and not by way of limitation, network environment 1000 may include multiple client devices 1006, inter-network facilitation system 104, third-party systems 1008, and/or networks 1004.

This disclosure contemplates any suitable network 1004. As an example, and not by way of limitation, one or more portions of network 1004 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1004 may include one or more networks 1004.

Links may connect client device 1006, the inter-network facilitation system 104 (which hosts the account configurator system 106), and third-party system 1008 to network 1004 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by client device 1006. As an example, and not by way of limitation, a client device 1006 may include any of the computing devices discussed above in relation to FIG. 9. A client device 1006 may enable a network user at the client device 1006 to access network 1004. A client device 1006 may enable its user to communicate with other users at other client devices 1006.

In particular embodiments, the client device 1006 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1006 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1006 one or more Hyper Text Markup Language ("HTML") files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1004) to link the third-party system 1008. For example, the inter-network facilitation system 104 may receive authentication credentials from a user to link a third-party system 1008 such as an online banking system to link an online bank account, credit account, debit account, or other financial account to a user profile within the inter-network facilitation system 104. The inter-network facilitation system 104 can subsequently communicate with the third-party system 1008 to detect or identify balances, transactions, withdrawal, transfers, deposits, credits, debits, or other transaction types associated with the third-party system 1008. The inter-network facilitation system 104 can further provide the aforementioned or other financial information associated with the third-party system 1008 for display via the client device 1006. In some cases, the inter-network facilitation system 104 links more than one third-party system 1008, receiving account information for accounts associated with each respective third-party system 1008 and performing operations or transactions between the different systems via authorized network connections.

In particular embodiments, the inter-network facilitation system 104 may interface between an online banking system and a credit processing system via the network 1004. For example, the inter-network facilitation system 104 can provide access to a bank account of a third-party system 1008 and linked to a user profile within the inter-network facilitation system 104. Indeed, the inter-network facilitation system 104 can facilitate access to, and transactions to and from, the bank account of the third-party system 1008 via a client application of the inter-network facilitation system 104 on the client device 1006. The inter-network facilitation system 104 can also communicate with a credit processing system, an ATM system, and/or other financial systems (e.g., via the network 1004) to authorize and process credit charges to a credit account, perform ATM transactions, perform transfers (or other transactions) between user profiles or across accounts of different third-party systems 1008, and to present corresponding information via the client device 1006.

In particular embodiments, the inter-network facilitation system 104 includes a model (e.g., a machine learning model) for approving or denying transactions. For example, the inter-network facilitation system 104 includes a transaction approval machine learning model that is trained based on training data such as user profile information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 1008), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1000 either directly or via network 1004. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1004.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles and/or account information for credit accounts, secured accounts, secondary accounts, and other affiliated financial networking system accounts. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 1006. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from client device 1006 responsive to a request received from client device 1006. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 1006 associated with users.

In addition, the third-party system 1008 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 1004. A third-party system 1008 can communicate with the inter-network facilitation system 104 to provide financial information pertaining to balances, transactions, and other information, whereupon the inter-network facilitation system 104 can provide corresponding information for display via the client device 1006. In particular embodiments, a third-party system 1008 communicates with the inter-network facilitation system 104 to update account balances, transaction histories, credit usage, and other internal information of the inter-network facilitation system 104 and/or the third-party system 1008 based on user interaction with the inter-network facilitation system 104 (e.g., via the client device 1006). Indeed, the inter-network facilitation system 104 can synchronize information across one or more third-party systems 1008 to reflect accurate account information (e.g., balances, transactions, etc.) across one or more networked systems, including instances where a transaction (e.g., a transfer) from one third-party system 1008 affects another third-party system 1008.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:
1. A system comprising:
at least one processor; and
a non-transitory computer readable medium comprising instructions that, when executed by the at least one processor, cause the system to:

generate, from a bundle type defining an attribute structure for a product within an inter-network facilitation system, a configuration bundle instance comprising a default set of attribute key-value pairs that are overridable within the attribute structure by applying an account override configuration, wherein-the configuration bundle instance being referenced by multiple product configurations to define and update configuration attributes of the multiple product configurations from a centralized data repository;

override, for an account configuration of the configuration bundle instance, a baseline key-value pair within the default set of attribute key-value pairs defined by the configuration bundle instance by applying the account override configuration comprising a replacement key-value pair specific to the account configuration, the replacement key- value pair comprising a bundle value referencing a modified configuration bundle instance that includes an override value;

in response to receiving a configuration query from a network component of the inter-network facilitation system for the account configuration corresponding to the product, identify a product configuration for the product comprising the replacement key-value pair;

extract a key name and a bundle value corresponding to the configuration bundle instance from the replacement key-value pair;

based on extracting the key name and the bundle value, generate the account configuration for the network component by extracting the default set of attribute key-value pairs from the configuration bundle instance and by extracting the override value from the modified configuration bundle instance; and based on detecting a modification to the configuration bundle instance, propagate the modification to the account configuration and to the multiple product configurations referencing the configuration bundle instance.

2. The system of claim 1, further comprising instructions that, when executed by the at least one processor, cause the system to:

generate the bundle type comprising attribute keys and schema value types for the attribute structure; and generate the configuration bundle instance by defining values for the attribute keys to generate the default set of attribute key-value pairs according to the schema value types.

3. The system of claim 2, further comprising instructions that, when executed by the at least one processor, cause the system to generate an additional configuration bundle instance by defining additional values for the attribute keys according to the schema value types to generate an additional set of attribute key-value pairs different from the default set of attribute key-value pairs of the configuration bundle instance.

4. The system of claim 3, further comprising instructions that, when executed by the at least one processor, cause the system to generate the account override configuration comprising an additional key-value pair comprising the key name and a different bundle value corresponding to the additional configuration bundle instance.

5. The system of claim 4, further comprising instructions that, when executed by the at least one processor, cause the system to:

in response to receiving an additional configuration query from one or more network components, extract the different bundle value corresponding to the key name from the additional key-value pair of the account override configuration; and generate an additional account configuration for the one or more network components by extracting, based on the account override configuration, the additional set of attribute key-value pairs from the additional configuration bundle instance.

6. The system of claim 1, further comprising instructions that, when executed by the at least one processor, cause the system to:

modify the configuration bundle instance by performing a single update of one or more of key names or values corresponding to the key names within the configuration bundle instance; and based on the single update, propagate the modification made to the configuration bundle instance to the multiple product configurations without applying updates to individual data fields across the multiple product configurations.

7. The system of claim 1, further comprising instructions that, when executed by the at least one processor, cause the system to:

modify the configuration bundle instance to reflect a modified set of attribute key-value pairs; and in response to receiving an additional configuration query for the account configuration corresponding to the product, generate the account configuration by extracting the modified set of attribute key-value pairs referenced by the bundle value of the product configuration.

8. The system of claim 1, further comprising instructions that, when executed by the at least one processor, cause the system to generate the account configuration by:

extracting the default set of attribute key-value pairs from the configuration bundle instance referenced by the bundle value of the key-value pair;

extracting additional key-value pairs defined by the product configuration; and combining the default set of attribute key-value pairs from the configuration bundle instance and the additional key-value pairs from the product configuration.

9. A method comprising:

generating, from a bundle type defining an attribute structure for a product within an inter-network facilitation system, a configuration bundle instance comprising a default set of attribute key-value pairs that are overridable within the attribute structure by applying an account override configuration, wherein-the configuration bundle instance being referenced by multiple product configurations to define and update configuration attributes of the multiple product configurations from a centralized data repository;

overriding, for an account configuration of the configuration bundle instance, a baseline key-value pair within the default set of attribute key-value pairs defined by the configuration bundle instance by applying the account override configuration comprising a replacement key-value pair specific to the account configuration, the replacement key-value pair comprising a bundle value referencing a modified configuration bundle instance that includes an override value;

in response to receiving a configuration query from a network component of the inter-network facilitation system for the account configuration corresponding to the product, identifying a product configuration for the product comprising the replacement key-value pair;

extracting a key name and a bundle value corresponding to the configuration bundle instance from the replacement key-value pair;

based on extracting the key name and the bundle value, generating the account configuration for the network component by extracting the default set of attribute key-value pairs from the configuration bundle instance and by extracting the override value from the modified configuration bundle instance; and based on detecting a modification to the configuration bundle instance, propagating the modification to the account configuration and to the multiple product configurations referencing the configuration bundle instance.

10. The method of claim 9, further comprising:

generating the bundle type comprising attribute keys and schema value types for the attribute structure; and generating the configuration bundle instance by defining values for the attribute keys to generate the default set of attribute key-value pairs according to the schema value types.

11. The method of claim 10, further comprising generating an additional configuration bundle instance by defining additional values for the attribute keys according to the schema value types to generate an additional set of attribute key-value pairs different from the default set of attribute key-value pairs of the configuration bundle instance.

12. The method of claim 11, further comprising generating the account override configuration comprising an additional key-value pair comprising the key name and a different bundle value corresponding to the additional configuration bundle instance.

13. The method of claim 12, further comprising:

in response to receiving an additional configuration query from one or more network components, extracting the different bundle value corresponding to the key name from the additional key-value pair of the account override configuration; and generating an additional account configuration for the one or more network components by extracting, based on the account override configuration, the additional set of attribute key-value pairs from the additional configuration bundle instance.

14. The method of claim 9, further comprising generating the product configuration for the product by generating the key-value pair comprising the key name and the bundle value and an additional key-value pair comprising a key name and an attribute value.

15. The method of claim 9, further comprising:

modify the configuration bundle instance to reflect a modified set of attribute key-value pairs; and in response to receiving an additional configuration query for the account configuration corresponding to the product, generate the account configuration by extracting the modified set of attribute key-value pairs referenced by the bundle value of the product configuration.

16. A non-transitory computer readable medium comprising instructions that, when executed by at least one processor, cause a computing device to:

generate, from a bundle type defining an attribute structure for a product within an inter-network facilitation system, a configuration bundle instance comprising a default set of attribute key-value pairs that are overridable within the attribute structure by applying an account override configuration, the configuration bundle instance being referenced by multiple product configurations to define and update configuration attributes of the multiple product configurations from a centralized data repository;

override, for an account configuration of the configuration bundle instance, a baseline key-value pair within the default set of attribute key-value pairs defined by the configuration bundle instance by applying the account override configuration comprising a replacement key-value pair specific to the account configuration, the replacement key-value pair comprising a bundle value referencing a modified configuration bundle instance that includes an override value;

in response to receiving a configuration query from a network component of the inter-network facilitation system for the account configuration corresponding to the product, identify a product configuration for the product comprising the replacement key-value pair;

extract a key name and a bundle value corresponding to the configuration bundle instance from the replacement key-value pair;

based on extracting the key name and the bundle value, generate the account configuration for the network component by extracting the default set of attribute key-value pairs from the configuration bundle instance and by extracting the override value from the modified configuration bundle instance; and based on detecting a modification to the configuration bundle instance, propagate the modification to the account configuration and to the multiple product configurations referencing the configuration bundle instance.

17. The non-transitory computer readable medium of claim 16, further comprising instructions that, when executed by the at least one processor, cause the computing device to:

generate the bundle type comprising attribute keys and schema value types for the attribute structure; and generate the configuration bundle instance by defining values for the attribute keys to generate the default set of attribute key-value pairs according to the schema value types.

18. The non-transitory computer readable medium of claim 17, further comprising instructions that, when executed by the at least one processor, cause the computing device to generate an additional configuration bundle instance by defining additional values for the attribute keys according to the schema value types to generate an additional set of attribute key-value pairs different from the default set of attribute key-value pairs of the configuration bundle instance.

19. The non-transitory computer readable medium of claim 18, further comprising instructions that, when executed by the at least one processor, cause the computing device to generate the account override configuration comprising an additional key-value pair comprising the key name and a different bundle value corresponding to the additional configuration bundle instance.

20. The non-transitory computer readable medium of claim 19, further comprising instructions that, when executed by the at least one processor, cause the computing device to:

in response to receiving an additional configuration query from one or more network components, extract the different bundle value corresponding to the key name from the additional key-value pair of the account override configuration; and generate an additional account configuration for the one or more network components by extracting, based on the account override configuration, the additional set of attribute key-value pairs from the additional configuration bundle instance.

\* \* \* \* \*